United States Patent
Matono

(10) Patent No.: US 7,626,785 B2
(45) Date of Patent: Dec. 1, 2009

(54) THIN FILM MAGNETIC HEAD, METHOD OF MANUFACTURING THE SAME, AND MAGNETIC RECORDING APPARATUS

(75) Inventor: Naoto Matono, Saku (JP)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 741 days.

(21) Appl. No.: 11/340,763

(22) Filed: Jan. 27, 2006

(65) Prior Publication Data

US 2006/0176614 A1    Aug. 10, 2006

(30) Foreign Application Priority Data

Feb. 10, 2005    (JP) .............................. 2005-034571

(51) Int. Cl.
*G11B 5/147* (2006.01)
(52) U.S. Cl. ...................................... 360/126
(58) Field of Classification Search .................. None
See application file for complete search history.

(56) References Cited

U.S. PATENT DOCUMENTS 6,646,828 B1 *  11/2003  Sasaki ................... 360/125.43
6,694,604 B2 *  2/2004   Santini .................... 29/603.14
6,857,181 B2 *  2/2005   Lo et al. .................. 29/603.15
6,912,772 B2 *  7/2005   Lahiri et al. ............ 29/603.16
6,950,277 B1 *  9/2005   Nguy et al. ............. 360/125.14

FOREIGN PATENT DOCUMENTS

JP    A-2003-242607    8/2003
JP    A-2003-242608    8/2003
JP    A-2004-281023    10/2004

* cited by examiner

*Primary Examiner*—Mark Blouin
(74) *Attorney, Agent, or Firm*—Oliff & Berridge, PLC

(57) ABSTRACT

A main magnetic pole layer is constructed so as to have a stacking structure in which a lower main magnetic pole layer having relative low saturated magnetic flux density and an exposed surface area is positioned on a leading side, and an upper main magnetic pole layer having relative high saturated magnetic flux density and having an exposed surface area is positioned on a trailing side. The exposed surface of a main magnetic pole layer has a planar shape of a bilaterally-symmetrical inverted trapezoidal shape in which a width of an upper edge is larger than a width of a lower edge and is equal to or larger than a width of the exposed surface of the main magnetic pole layer at an arbitrary intermediate position between the lower edge and the upper edge. In particular, a height at a center position in the exposed surface area in the upper main magnetic pole layer is larger than a height in the exposed surface area in an arbitrary peripheral position around the center point.

15 Claims, 11 Drawing Sheets

THIN FILM MAGNETIC HEAD, METHOD OF MANUFACTURING THE SAME, AND MAGNETIC RECORDING APPARATUS

BACKGROUND OF THE INVENTION

1. Field of the Invention

The present invention relates to a thin film magnetic head having at least an inductive magnetic transducer for recording, a method of manufacturing the same, and a magnetic recording apparatus in which a thin film magnetic head is mounted.

2. Description of the Related Art

In recent years, in association with improvement in areal density of a magnetic recording medium (hereinbelow, simply called "recording medium") such as a hard disk, improvement in the performance of a thin film magnetic head to be mounted on a magnetic recording apparatus such as a hard disk drive (HDD) is demanded. Examples of known recording methods of a thin film magnetic head are a longitudinal recording method in which the orientation of a signal magnetic field is set to an in-plane direction (longitudinal direction) of a recording medium and a perpendicular recording method in which the orientation of a signal magnetic field is set to a direction orthogonal to the surface of a recording medium. At present, the longitudinal recording method is widely used. However, when a market trend accompanying improvement in areal density of a recording medium is considered, it is assumed that, in place of the longitudinal recording method, the perpendicular recording method will be regarded as a promising method in future for the following reason. The perpendicular recording method has advantages such that high linear recording density can be assured and a recorded recording medium is not easily influenced by thermal decay.

A thin film magnetic head of the perpendicular recording method has, mainly, a thin film coil for generating a magnetic flux for recording and a magnetic pole layer extending rearward from an air bearing surface and generating a magnetic field (perpendicular magnetic field) for magnetizing a recording medium on the basis of the magnetic flux generated by the thin film coil. In the thin film magnetic head of the perpendicular recording method, the recording medium is magnetized by the perpendicular magnetic field generated in the magnetic pole layer and information is magnetically recorded on the recording medium.

Some modes of the structure of the thin film magnetic head in the perpendicular recording method have already been proposed. Concretely, for example, there is a known main magnetic pole (magnetic multilayer film) constructed so as to have a stacked structure in which a high-saturation magnetic flux density layer and a low-saturation magnetic flux density layer are alternately stacked to prevent recorded information from being erased after recording by suppressing occurrence of a residual magnetic field right after recording operation (refer to, for example, Japanese Patent Laid-open No. 2004-281023). In the thin film magnetic head of perpendicular recording method having the main magnetic pole of this kind, the main magnetic pole has a return magnetic domain structure so that occurrence of residual magnetization is suppressed. Consequently, the residual magnetic field is not easily generated right after recording operation and erasure after recording dose not easily occur.

SUMMARY OF THE INVENTION

To spread a thin film magnetic head of the perpendicular recording method, for example, in order to improve recording performance, it is necessary to increase the intensity of a perpendicular magnetic field as much as possible and narrow recording track width as much as possible. It is, however, difficult to satisfy both of assurance of the strength of a perpendicular magnetic field and reduction in the recording track width in a traditional thin film magnetic head of the perpendicular recording method. Consequently, there is a problem such that it is difficult to improve the recording performance.

To be concrete, in a traditional thin film magnetic head of the perpendicular recording method, it is sufficient to make a magnetic pole layer by using, for example, a magnetic material having high saturated magnetic flux density to increase the strength of a perpendicular magnetic field to thereby improve the recording performance. In the case of making the magnetic pole layer by using a magnetic material having high saturated magnetic flux density, the strength of a perpendicular magnetic field increases as demanded. However, a fringe phenomenon (magnetic flux spreading phenomenon) becomes conspicuous when a magnetic flux for recording is emitted from the magnetic pole layer, so that the recording track width enlarges due to the fringe phenomenon of the magnetic flux.

On the other hand, in a traditional thin film magnetic head of the perpendicular recording method, to narrow the recording track width to thereby improve the recording performance, for example, it is sufficient to narrow the width of the front end (optical track width) of a magnetic pole layer in accordance with a desired recording track width (effective track width). In the case of narrowing the width of the front end of the magnetic pole layer, the recording track width is narrowed as demanded. However, the magnetic volume (magnetic flux containing amount) decreases due to the reduction in the width of the front end portion of the magnetic pole layer. Due to the decrease in the magnetic volume, the strength of the perpendicular magnetic field tends to decrease.

From the above, in the traditional thin film magnetic head of the perpendicular recording method, assurance of the strength of a perpendicular magnetic field and reduction in the recording track width have a trade-off relation. It is consequently difficult to satisfy both of assurance of the strength of a perpendicular magnetic field and reduction in the recording track width. Therefore, improvement in the recording performance of the thin film magnetic head of the perpendicular recording method demands establishment of a technique capable of satisfying both assurance of the strength of a perpendicular magnetic field and reduction in the recording track width. In this case, particularly, it is also important to establish a technique capable of manufacturing the thin film magnetic head of the perpendicular recording method as easy as possible in consideration of mass productivity of the thin film magnetic head of the perpendicular recording method.

The present invention has been achieved in view of the problems. It is desirable to provide a thin film magnetic head and a magnetic recording apparatus realizing improved recording performance by satisfying both of assurance of the strength of a perpendicular magnetic field and reduction in the recording track width.

It is desirable to provide a method of manufacturing a thin film magnetic head, capable of easily manufacturing a thin film magnetic head realizing improved recording performance by satisfying both of the assurance of the strength of a perpendicular magnetic field and reduction in the recording track width.

A thin film magnetic head according to a first aspect of the invention includes: a thin film coil for generating a magnetic flux; and a magnetic pole layer extending rearward from a recording-medium-facing surface which faces a recording medium traveling in a medium travel direction, generating a magnetic field for magnetizing the recording medium in a direction orthogonal to the surface of the recording medium on the basis of the magnetic flux generated by the thin film coil, and including a magnetic pole having an exposed surface which is defined by a first edge positioned on an opposite side in the medium travel direction and a second edge positioned in the medium travel direction and is exposed on the recording-medium-facing surface. The magnetic pole in the magnetic pole layer has a stacking structure in which first and second magnetic pole portions are stacked and adjacent to each other. The first magnetic pole portion is positioned on the opposite side in the medium travel direction, has a relatively low first saturated magnetic flux density, and has a first exposed surface area constructing a part of the exposed surface. The second magnetic pole portion is positioned in the medium travel direction, has a relatively high second saturated magnetic flux density, and has a second exposed surface area constructing another part of the exposed surface. A width of the second edge in the exposed surface is larger than a width of the first edge in the exposed surface, and is equal to or larger than a width of the exposed surface at an arbitrary intermediate position between the first and the second edges. A height at a center position in the second exposed surface area is larger than a height of the second exposed surface area at an arbitrary peripheral position around the center position.

In the thin film magnetic head according to the first aspect of the invention, the magnetic pole in the magnetic pole layer has a stacking structure in which a first magnetic pole portion having a relatively low first saturated magnetic flux density is positioned on the opposite side in the medium travel direction, and a second magnetic pole portion having a relatively high second saturated magnetic flux density is positioned in the medium travel direction. The exposed surface has a planar shape in which a width of the second edge is larger than a width of the first edge; and is equal to or larger than a width of the exposed surface at an arbitrary intermediate position between the first and the second edges. In particular, a height at a center position in the second exposed surface area is larger than a height of the second exposed surface area at an arbitrary peripheral position around the center position. In this case, based on the fact that the second magnetic pole portion has the relatively high second saturated magnetic flux density, the magnetic volume (magnetic flux storing amount) increases in a part on the front side in the medium travel direction (second magnetic pole portion) as a main magnetic flux emitting part of the magnetic pole. Consequently, also in the case where the first magnetic pole portion has the relatively low first saturated magnetic flux density, the amount of the magnetic flux emitted from the magnetic pole increases. In particular, the height at the center position in the second exposed surface area is larger than the height in the second exposed surface area in an arbitrary peripheral position around the center position. That is, based on the fact that a center area in the second exposed surface area partly projects to the opposite side in the medium travel direction, the area occupied by the second magnetic pole portion in the magnetic pole locally increases only by the projection amount (the magnetic volume of the second magnetic pole portion locally increases), so that the amount of the magnetic flux emitted from the magnetic pole increases conspicuously. It assures the strength of the perpendicular magnetic field in an information recording operation. Moreover, as described above, the central area in the second exposed surface area partially bulges to the opposite side in the medium travel direction, that is, the area in the periphery of the central area in the second exposed surface area partially recedes from the central area in the medium travel direction. Accordingly, the range occupied by the second magnetic pole portion in the magnetic pole locally decreases in the receding portion (the magnetic volume of the second magnetic pole portion locally decreases), so that occurrence of the fringe phenomenon when the magnetic flux is emitted from the magnetic pole is suppressed. As a result, increase in the width of a recording track caused by the fringe phenomenon of the magnetic flux is suppressed in the information recording operation, so that the width of the recording track is reduced.

An embodiment of the present invention also provides a method of manufacturing a thin film magnetic head including: a thin film coil for generating a magnetic flux; and a magnetic pole layer extending rearward from a recording-medium-facing surface which faces a recording medium traveling in a medium travel direction, generating a magnetic field for magnetizing the recording medium in a direction orthogonal to the surface of the recording medium on the basis of the magnetic flux generated by the thin film coil, and including a magnetic pole having an exposed surface which is defined by a first edge positioned on an opposite side in the medium travel direction and a second edge positioned in the medium travel direction and is exposed on the recording-medium-facing surface. A step of forming the magnetic pole in the magnetic pole layer includes: a first step of forming a first pre-magnetic pole portion so as to have a shape corresponding to the magnetic pole by using a magnetic material having a relatively low first saturated magnetic flux density; a second step of forming a first magnetic pole portion constructing a part of the magnetic pole by partially etching the first pre-magnetic pole portion from the medium travel direction; and a third step of forming a second magnetic pole portion constructing another part of the magnetic pole on the first magnetic pole portion by using a magnetic material having a relatively high second saturated magnetic flux density, thereby forming the magnetic pole so as to have a stacking structure in which the first magnetic pole portion positioned on the opposite side in the medium travel direction and the second magnetic pole portion positioned in the medium travel direction are stacked so as to be adjacent to each other. A width of the second edge is larger than a width of the first edge, and is equal to or larger than a width of the exposed surface at an arbitrary intermediate position between the first and the second edges, and the first magnetic pole portion has a first exposed surface area constructing a part of the exposed surface, the second magnetic pole portion has a second exposed surface area constructing another part of the exposed surface, and a height at a center position in the second exposed surface area is set to be larger than a height of the second exposed surface area at an arbitrary peripheral position around the center position.

In the method of manufacturing a thin film magnetic head according to an embodiment of the invention, a first pre-magnetic pole portion is formed by using a magnetic material having a relatively low first saturated magnetic flux density. Subsequently, by partially etching the first pre-magnetic pole portion from the front side in the medium travel direction, a first magnetic pole portion is formed. After that, a second magnetic pole portion is formed on the first magnetic pole portion by using a magnetic material having a relatively high second saturated magnetic flux density, thereby forming the magnetic pole in the magnetic pole layer so as to have a stacking structure in which the first magnetic pole portion positioned on the opposite side in the medium travel direction and the second magnetic pole portion positioned in the medium travel direction are stacked so as to be adjacent to each other. The exposed surface has a planar shape in which a width of the second edge is larger than a width of the first edge, and is equal to or larger than a width of the exposed surface at an arbitrary intermediate position between the first and the second edges and, particularly, a height at a center position in the second exposed surface area is set to be larger than a height of the second exposed surface area at an arbitrary peripheral position around the center position. In this case, for forming the magnetic pole, only existing thin film processes including the film forming technique, patterning technique, and etching technique are used but novel and complicated manufacturing processes are not used.

An embodiment of the invention also provides a magnetic recording apparatus on which a recording medium and a thin film magnetic head for performing a magnetic process on the recording medium are mounted. The thin film magnetic head includes: a thin film coil for generating a magnetic flux; and a magnetic pole layer extending rearward from a recording-medium-facing surface which faces a recording medium traveling in a medium travel direction, generating a magnetic field for magnetizing the recording medium in a direction orthogonal to the surface of the recording medium on the basis of the magnetic flux generated by the thin film coil, and including a magnetic pole having an exposed surface which is defined by a first edge positioned on an opposite side in the medium travel direction and a second edge positioned in the medium travel direction and is exposed on the recording-medium-facing surface. The magnetic pole in the magnetic pole layer has a stacking structure in which first and second magnetic pole portions are stacked and adjacent to each other. The first magnetic pole portion is positioned on the opposite side in the medium travel direction, has a relatively low first saturated magnetic flux density, and has a first exposed surface area constructing a part of the exposed surface. The second magnetic pole portion is positioned in the medium travel direction, has a relatively high second saturated magnetic flux density, and has a second exposed surface area constructing another part of the exposed surface. A width of the second edge in the exposed surface is larger than a width of the first edge, and is equal to or larger than a width of the exposed surface at an arbitrary intermediate position between the first and the second edges, and a height at a center position in the second exposed surface area is larger than a height of the second exposed surface area at an arbitrary peripheral position around the center position.

Since the above-mentioned thin film magnetic head is mounted on the magnetic recording apparatus of an embodiment of the invention, the strength of a perpendicular magnetic field is assured in the information recording operation and the width of a recording track is narrowed.

A thin film magnetic head according to a second aspect of the invention includes a magnetic pole obtained by stacking a first magnetic pole portion positioned on the opposite side in a recording medium travel direction and having a relatively low first saturated magnetic flux density and a second magnetic pole portion positioned on the recording medium travel direction and having a relatively high second saturated magnetic flux density, constructed so as to have an exposed surface exposed on a recording-medium-facing surface, and generating a recording magnetic field for magnetizing a recording medium in a perpendicular direction. A height at a center position in the width direction of the second magnetic pole portion is the maximum in the width direction in the exposed surface.

The thin film magnetic head according to the second aspect of the invention has a stacking structure in which a first magnetic pole portion having a relatively low saturated magnetic flux density is positioned on the opposite side in a recording medium travel direction, and a second magnetic pole portion having a relatively high saturated magnetic flux density is positioned on the recording medium travel direction. The magnetic pole is constructed so that a height at a center position in the width direction of the second magnetic pole portion becomes the maximum in the width direction in the exposed surface. In this case, as described above, the amount of the magnetic flux emitted from the magnetic pole increases, so that the strength of the perpendicular magnetic field is assured in an information recording operation. Moreover, occurrence of the fringe phenomenon when the magnetic flux is emitted from the magnetic pole is suppressed. As a result, increase in the width of a recording track caused by the fringe phenomenon of the magnetic flux is suppressed in the information recording operation, so that the width of the recording track is reduced.

Preferably, in the thin film magnetic head according to the first aspect of the invention, the height at the center position in the second exposed surface area is smaller than that at the center position in the first exposure surface area.

In the thin film magnetic head according to the first aspect of the invention, the height at the center position in the second exposed surface area may be the maximum at the center position, and gradually decrease with distance from the center position toward the periphery. In this case, the height of the second exposed surface area may change so that a boundary line provided in a position where the first and second exposed surface areas are adjacent to each other bulges toward the opposite side in the medium travel direction. The boundary line may not be in contact with the second edge, and the minimum height of the second exposed surface area may be larger than zero. Alternately, the boundary line may be in contact with the second edge, and the minimum height of the second exposed surface area may be zero. The minimum height of the second exposed surface area may be equal to the width of the second edge or smaller than the width of the second edge.

In the thin film magnetic head according to the first aspect of the invention, preferably, the first saturated magnetic flux density is within a range from 1.80 T (tesla) to 2.30 T and the second saturated magnetic flux density is within a range from 2.20 T to 2.45 T.

In particular, the method of manufacturing a thin film magnetic head according to the invention may further include a fourth step of forming the exposed surface so as to include the first and second exposed surface areas by forming the recording-medium-facing surface by processing at least the magnetic pole.

In the method of manufacturing a thin film magnetic head according to the invention, the first step may include the steps of forming a photoresist pattern so as to have an opening corresponding to the shape of the magnetic pole; forming the first pre-magnetic pole portion in the opening provided in the photoresist pattern; and removing the photoresist pattern so as to leave the first pre-magnetic pole portion. The method may further include, between the first and second steps, a fifth step of forming an insulating layer so as to bury the periphery of the first pre-magnetic pole portion by forming a pre-insulating layer so as to cover the first pre-magnetic pole portion and its peripheral area and polishing and planarizing at least the pre-insulating layer until the first pre-magnetic pole portion is exposed. In the second step, a magnetic pole formation area for forming the second magnetic pole portion is defined so as to be surrounded by the first magnetic pole portion and the insulating layer. The third step may include the steps of forming a second pre-magnetic pole portion so as to bury at least the magnetic pole formation area; and forming the second magnetic pole portion in the magnetic pole formation area by polishing and planarizing at least the second pre-magnetic pole portion until the insulating layer is exposed.

In particular, in the thin film magnetic head according to the second aspect of the invention, preferably, the edge in the recording medium travel direction in the second magnetic pole portion has the maximum width of the magnetic pole in the exposed surface.

In the thin film magnetic head and the magnetic recording apparatus according to an embodiment of the invention, the magnetic pole in the magnetic pole layer is constructed so as to have the stacking structure in which a first magnetic pole portion having a relatively low first saturated magnetic flux density is positioned on the opposite side in the medium travel direction, and a second magnetic pole portion having a relatively high second saturated magnetic flux density is positioned in the medium travel direction. The exposed surface has a planar shape in which a width of the second edge is larger than a width of the first edge, and is equal to or larger than a width of the exposed surface at an arbitrary intermediate position between the first and the second edges. In particular, a height at a center position in the second exposed surface area is larger than a height of the second exposed surface area at an arbitrary peripheral position around the center position. Based on the structural features, the strength of the perpendicular magnetic field is assured in an information recording operation and the width of a recording track is narrowed. Therefore, by satisfying both of assurance of the strength of a perpendicular magnetic field and reduction in the width of a recording track, the recording performance can be improved.

In the method of manufacturing a thin film magnetic head according to an embodiment of the invention, a first pre-magnetic pole portion is formed by using a magnetic material having a relatively low first saturated magnetic flux density, a first magnetic pole portion is formed by partially etching the first pre-magnetic pole portion from the medium travel direction and, after that, a second magnetic pole portion is formed by using a magnetic material having a relatively high second saturated magnetic flux density, thereby enabling the magnetic pole to be formed by using only existing thin film processes on the basis of the manufacturing features of forming the magnetic pole in the magnetic pole layer. Therefore, a thin film magnetic head with improved recording performance by satisfying both assurance of the strength of a perpendicular magnetic field and reduction in the recording track width can be manufactured easily.

DETAILED DESCRIPTION OF THE PRFERRED EMBODIMENTS

Embodiments of the invention will be described in detail hereinbelow with reference to the drawings.

Figure 1:
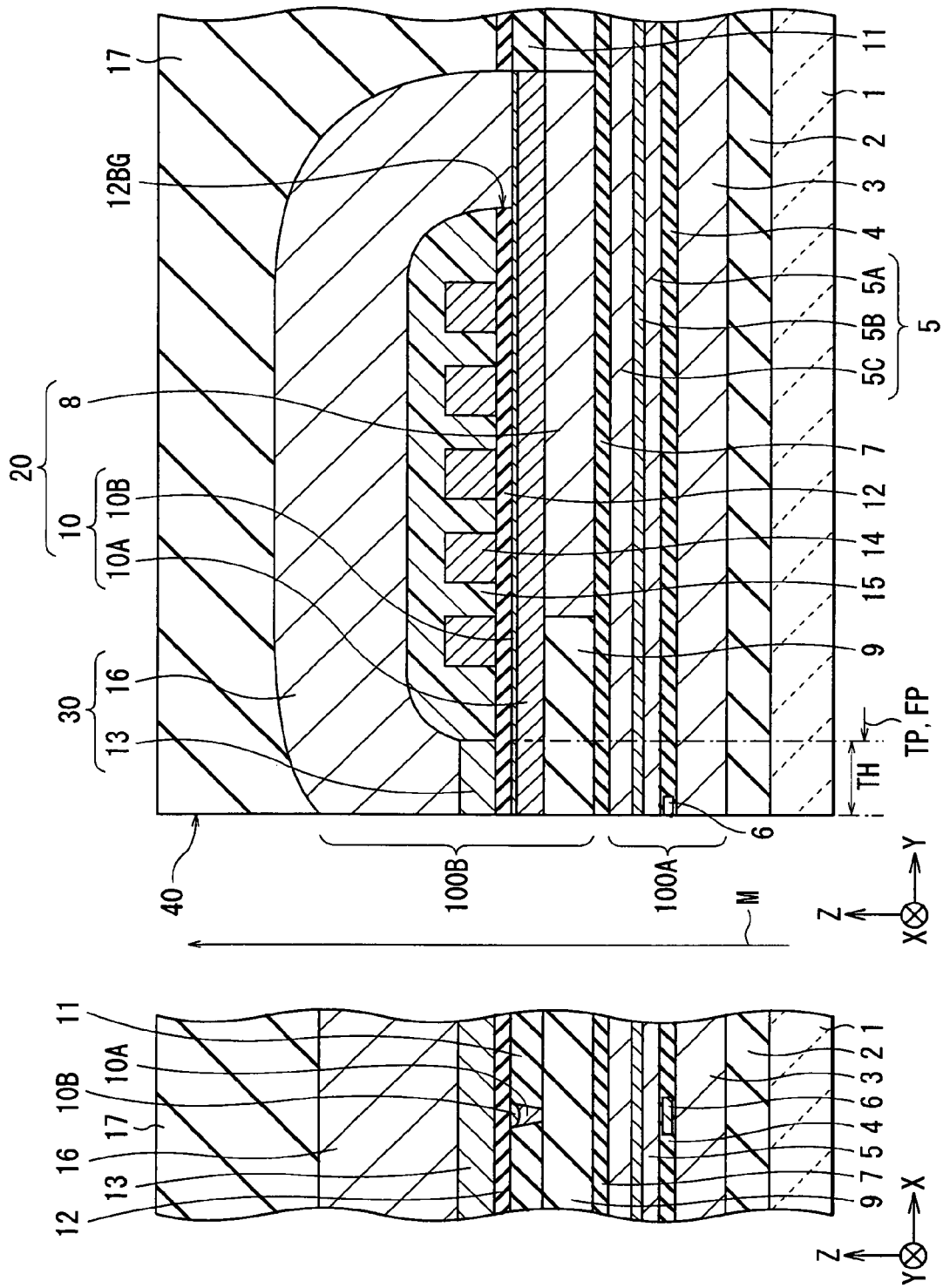
FIGS. 1A and 1B are cross sections showing a sectional configuration of a thin film magnetic head according to an embodiment of the invention.
Figure 2:
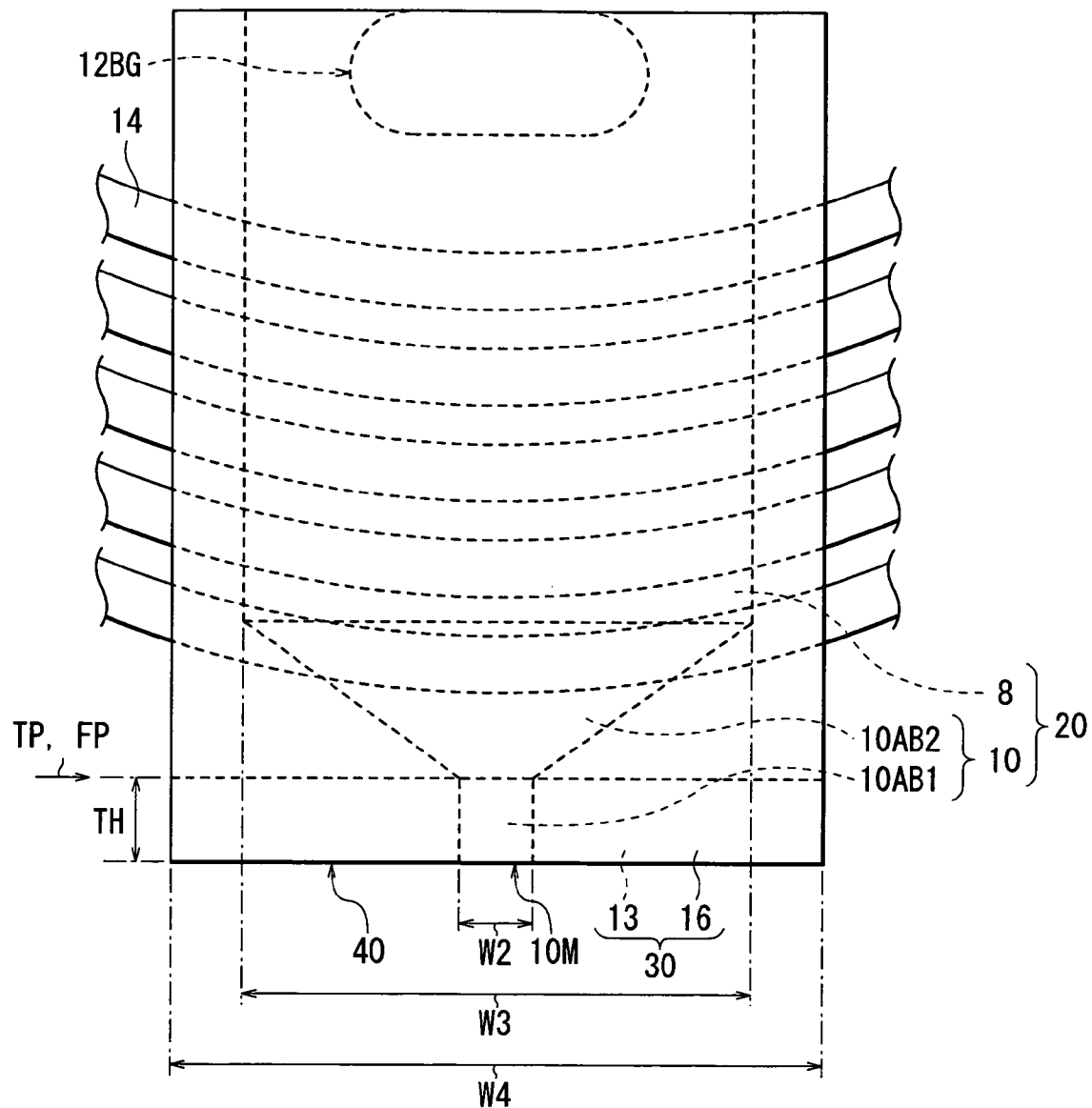
FIG. 2 is a plan view showing a plan configuration of a main part in the thin film magnetic head illustrated in FIG. 1.
Figure 3:
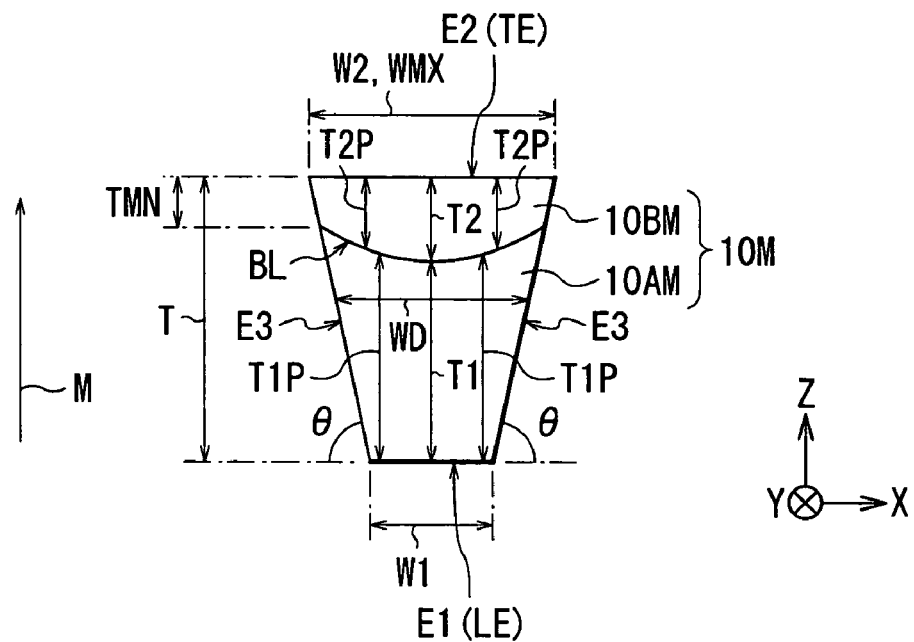
FIG. 3 is an enlarged plan view showing a plan configuration of an exposed surface of a main magnetic pole layer.
Figure 4:
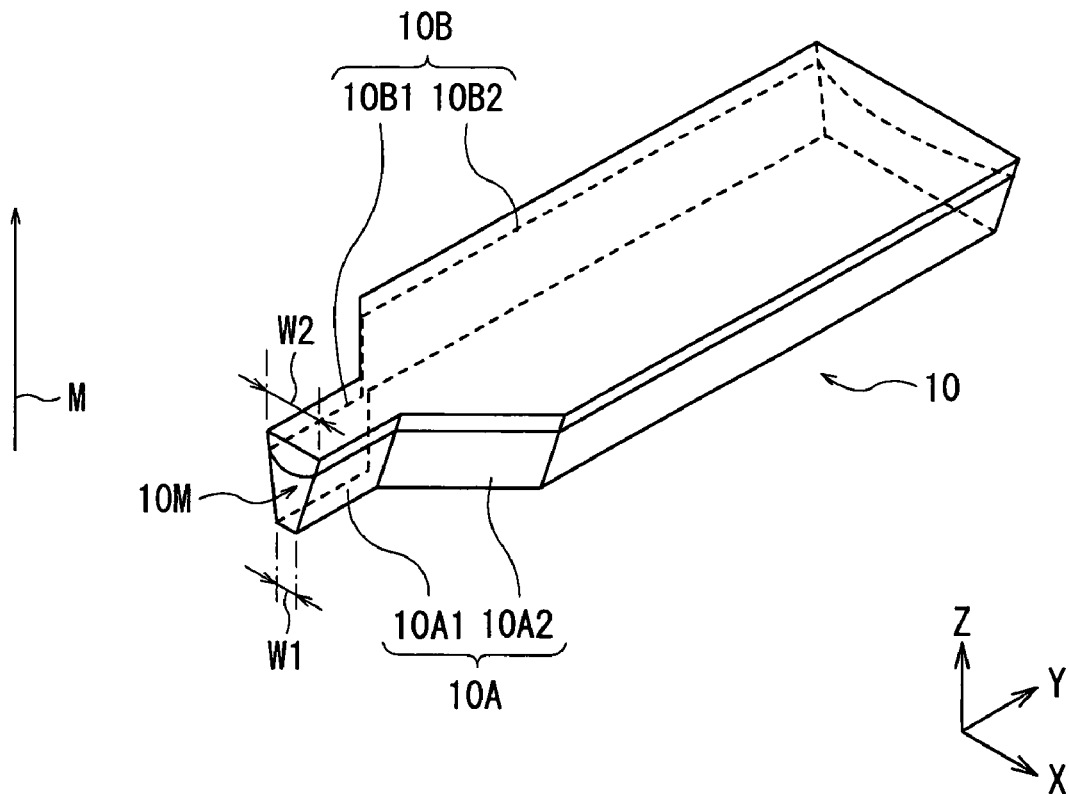
FIG. 4 is an enlarged perspective view showing a perspective configuration of the main magnetic pole layer.

First, the configuration of a thin film magnetic head according to an embodiment of the invention will be described with reference to FIGS. 1A and 1B to FIG. 4. FIGS. 1A and 1B to FIG. 4 show a configuration of a thin film magnetic head. FIGS. 1A and 1B show a general sectional configuration. FIG. 2 shows a planar configuration (a planar configuration seen from the Z-axis direction) of the main part in the thin film magnetic head. FIG. 3 shows an enlarged planar configuration (a planar configuration seen from the Y-axis direction) of an exposed surface 10M of a main magnetic pole layer 10. FIG. 4 shows an enlarged perspective configuration of the main magnetic pole layer 10. FIG. 1A shows a sectional configuration parallel to an air bearing surface 40 (a sectional configuration along an XZ plane) and FIG. 1B shows a sectional configuration perpendicular to the air bearing surface 40 (a sectional configuration along a YZ plane). An upward arrow M shown in FIGS. 1A and 1B indicates the travel direction of a recording medium (not shown) relative to the thin film magnetic head (medium travel direction or recording medium travel direction).

In the following description, a dimension in the X-axis direction shown in FIGS. 1A and 1B to FIG. 4 will be described as "width", a dimension in the Y-axis direction will be described as "length", and the distance in the Z-axis direction will be described as "thickness or height". The side closer to the air bearing surface 40 in the Y-axis direction will be described as "forward" and the side opposite to the forward will be described as "rearward". The description will be similarly used in FIG. 5 and subsequent drawings.

The thin film magnetic head according to the embodiment is to be mounted on a magnetic recording apparatus such as a hard disk drive in order to perform a magnetic process on a magnetic medium such as a hard disk traveling in the medium travel direction M. Concretely, the thin film magnetic head is, for example, is a composite head capable of executing both a recording process and a reproducing process as magnetic processes. As shown in FIGS. 1A and 1B, the thin film magnetic head has a configuration obtained by sequentially stacking, on a substrate 1 made of a ceramic material such as AlTiC ($Al_2O_3.TiC$), an insulating layer 2 made of a non-magnetic insulating material such as alumina oxide ($Al_2O_3$, hereinbelow, simply called "alumina"), a reproducing head portion 100A for executing a reproducing process by using a magneto-resistive (MR) effect, an isolation layer 7 made of a non-magnetic insulating material such as alumina, a recording head portion 100B of a shield type for executing a recording process of a perpendicular recording method, and an overcoat layer 17 made of a non-magnetic insulating material such as alumina.

The reproducing head portion 100A has, for example, a stacking configuration in which a lower read shield layer 3, a shield gap film 4, and an upper read shield layer 5 are stacked in this order. An MR device 6 as a reproducing device is buried in the shield gap film 4 so that one end face is exposed on a recording-medium-facing surface (air bearing surface) 40 which faces a recording medium.

The lower and upper read shield layers 3 and 5 are provided to magnetically isolate the MR device 6 from the periphery and extend rearward from the air bearing surface 40. The lower read shield layer 3 is made of, for example, a magnetic material such as a nickel iron alloy (NiFe (for example, Ni: 80% by weight and Fe: 20% by weight) which will be simply called "permalloy (trademark)" hereinbelow). The upper read shield layer 5 has, for example, a configuration (three-layer configuration) in which a nonmagnetic layer 5B made of ruthenium (Ru), aluminum (Al) or the like is sandwiched between upper read shield layer portions 5A and 5C made of a magnetic material such as permalloy. The upper read shield layer 5 does not always have to have a stacking structure, but may have a single layer structure.

The shield gap film 4 is used to electrically isolate the MR device 6 from the periphery and is made of, for example, a non-magnetic insulating material such as alumina.

The MR device 6 is provided to execute a reproducing process by using giant magneto-resistive (GMR) effect, tunneling magneto-resistive (TMR) effect, or the like.

The recording head portion 100B has, for example, a stacking configuration obtained by sequentially stacking a magnetic pole layer 20 whose periphery is buried by insulating layers 9 and 11, a gap layer 12 in which an opening (a back gap 12BG) for magnetic coupling is provided, a thin film coil 14 buried by an insulating layer 15, and a write shield layer 30. In FIG. 2, the thin film coil 14, the magnetic pole layer 20, and the write shield layer 30 out of the recording head portion 100B are shown.

The magnetic pole layer 20 contains a magnetic flux for recording generated in the thin film coil 14, and executes a recording process by emitting the magnetic flux toward a recording medium. More concretely, the magnetic pole layer 20 generates a magnetic field (perpendicular magnetic field) for magnetizing the recording medium in the direction orthogonal to the surface of the recording medium on the basis of the magnetic flux for recording as a recording process in the perpendicular recording method. The magnetic pole layer 20 is disposed on the leading side of the thin film coil 14 and extends rearward from the air bearing surface 40, concretely, to the position corresponding to the back gap 12BG. The "leading side" is an inflow side of a recording medium (the bottom side in the medium travel direction M) when a traveling state of the recording medium traveling in the medium travel direction M shown in FIG. 1B is regarded as a flow and is, in this case, a lower side in the thickness direction (Z-axis direction). On the other side, an outflow side (the front side in the medium travel direction M) is called a "trailing side" and is an upper side in the thickness direction.

The magnetic pole layer 20 has, for example as shown in FIG. 1B, a stacking configuration obtained by stacking sequentially an auxiliary magnetic layer 8 whose periphery is buried by the insulating layer 9 and the main magnetic pole layer 10 whose periphery is buried by the insulating layer 11. The magnetic pole layer 20 has, that is, a two-layer configuration in which the auxiliary magnetic layer 8 is positioned on the leading side and the main magnetic pole layer 10 is positioned on the trailing side.

The auxiliary magnetic pole layer 8 functions as a main magnetic flux containing part and is adjacent to the main magnetic pole layer 10 so as to be magnetically coupled to each other. The auxiliary magnetic pole layer 8 extends, for example, rearward from the position receding from the air bearing surface 40, concretely, to the position corresponding to the back gap 12BG. For example, the auxiliary magnetic pole layer 8 has, as shown in FIG. 2, a planar shape of a rectangular shape having a width W3. The auxiliary magnetic pole layer 8 is, for example, made of a magnetic material having a high-saturated magnetic flux density such as permalloy or iron-cobalt-base alloy. Examples of the iron-cobalt-base alloy are iron cobalt alloy (FeCo) and iron cobalt nickel alloy (FeCoNi).

The main magnetic pole layer 10 functions as a main magnetic flux emitting part and is adjacent to the auxiliary magnetic pole layer 8 so as to be coupled magnetically. The main magnetic pole layer 10 extends, for example, rearward from the air bearing surface 40, concretely, to the position corresponding to the back gap 12BG and has a planar shape of simplified battledore shape. Concretely, the main magnetic pole layer 10 includes, for example as shown in FIG. 2, in order from the air bearing surface 40, a front end portion 10AB1 as a magnetic pole having a uniform width W2 specifying a recording track width of the recording medium and a rear end portion 10AB2 coupled to the back side of the front end portion 10AB1 and having a width W3 larger than the width W2 (W3>W2) of the front end portion 10AB1. The width of the rear end portion 10AB2 is, for example, uniform width (W3) in the rear position and, narrows gradually in the forward position from the width W3 to the width W2 toward the front end portion 10AB1. "The planar shape of the main magnetic pole layer 10" described here is, as obvious from FIG. 2, a projection shape of the main magnetic pole layer 10, that is, a shape specified by the outside edge (outline) of the main magnetic pole layer 10. The position at which the width of the main magnetic pole layer 10 increases from the front end portion 10AB1 (the width W2) to the rear end portion 10AB2 (the width W3), that is, the position at which the width of the main magnetic pole layer 10 begins to increase from the uniform width W2 specifying the recording track width of the recording medium is a "flare point FP" as one of important factors for determining the recording performance of the thin film magnetic head.

The main magnetic pole layer 10 has, as shown in FIGS. 2 and 3, the exposed surface 10M exposed on the air bearing surface 40 and the exposed surface 10M has a height T. The exposed surface 10M is, as shown in FIG. 3, defined by a lower edge E1 (first edge) positioned on the leading side and an upper edge E2 (second edge) positioned on the trailing side. More specifically, the exposed surface 10M is defined by the lower edge E1 (so-called leading edge LE) having the width W1, the upper edge E2 (so-called trailing edge TE) having the width W2, and two side edges E3 positioned on the left and right sides in the width direction (X-axis direction). In particular, in the exposed surface 10M, the width W2 of the upper edge E2 is larger than the width W1 of the lower edge E1 (W2>W1), and is equal to or larger than a width WD of the exposed surface 10M in an intermediate position between the lower edge E1 and the upper edge E2 (W2≧VWD). For example, (1) the lower edge E1 and the upper edge E2 are in parallel with each other, (2) the side edges E3 extend linearly, (3) the width W2 of the upper edge E2 is larger than the width WD of the exposed surface 10M (W2>WD), and (4) the angles θ of inclination of the two side edges E3 (the angles between the extending direction of the lower edge E1 and the side edges E3) are equal to each other. Consequently, the exposed surface 10M has a planar configuration of a quadrangle shape (so-called inverted trapezoidal shape which is bilaterally symmetrical) where the lower edge E1 is used as the shorter one of the two sides facing each other (the bottom side) and the upper edge E2 is used as the longer side (the top side) of the two sides facing each other.

In particular, the main magnetic pole layer 10 has, as shown in FIG. 4, a stacking structure obtained by stacking a lower main magnetic pole layer 10A and an upper main magnetic pole layer 10B so as to be adjacent to each other. That is, the main magnetic pole layer 10 has a two-layer structure in which the lower main magnetic pole layer 10A is positioned on the leading side and the upper main magnetic pole layer 10B is positioned on the trailing side.

The lower main magnetic pole layer 10A functions as a part supplying the magnetic flux to the upper main magnetic pole layer 10B in the main magnetic pole layer 10, and is adjacent to and magnetically coupled to the upper main magnetic pole layer 10B. The lower main magnetic pole layer 10A has, for example, a relatively low saturated magnetic flux density S1 (first saturated magnetic flux density=about 1.80 T (tesla) to 2.30 T), that is, is made of a magnetic material having the saturated magnetic flux density S1. An example of the magnetic material having the saturated magnetic flux S1 is iron cobalt nickel alloy (FeCoNi). Specifically, the lower main magnetic pole layer 10A has, as shown in FIG. 3, an exposed surface area 10AM (first exposed surface area) which is a part of the exposed surface 10M. The lower main magnetic pole layer 10A also includes, for example, as shown in FIG. 4, the front end portion 10A1 as a part of the front end portion 10AB1 and the rear end portion 10A2 as a part of the rear end portion 10AB2.

The upper main magnetic pole layer 10B functions as a substantial magnetic flux emitting part in the main magnetic pole layer 10, and is adjacent to and magnetically coupled to the lower main magnetic pole layer 10A. The upper main magnetic pole layer 10B has, for example, a relatively high saturated magnetic flux density S2 (second saturated magnetic flux density=about 2.20 T to 2.45 T), that is, is made of a magnetic material having the saturated magnetic flux density S2. An example of the magnetic material having the saturated magnetic flux S2 is iron-cobalt-base alloy. Specifically, the upper main magnetic pole layer 10B has, as shown in FIG. 3, an exposed surface area 10BM (second exposed surface area) which is another part of the exposed surface 10M. The upper main magnetic pole layer 10B also includes, for example, as shown in FIG. 4, the front end portion 10B1 as another part of the front end portion 10AB1 and the rear end portion 10B2 as another part of the rear end portion 10AB2.

The exposed surface 10M of the main magnetic pole layer 10 including the lower main magnetic pole layer 10A and the upper main magnetic pole layer 10B includes, as shown in FIG. 3, the exposed surface area 10AM in the lower main magnetic pole layer 10A and the exposed surface area 10BM in the upper main magnetic pole layer 10B. In the exposed surface 10M, a height T2 at the center position in the exposed surface area 10BM is larger than a height T2P of the exposed surface area 10BM (T2>T2P) in an arbitrary position in the peripheral of the center position. That is, in the exposed surface area 10M, the height T2 at the center in the width direction of the upper main magnetic layer 10B is the largest in the width direction. In the exposed surface 10M, for example, the height T1 at the center position is smaller than a height T1P of the exposed surface area 10AM (T1<T1P) in an arbitrary position in the periphery of the center position. The "center position (or the center portion)" is not always limited to the strict center position in the width direction of the exposed surface area 10AM or 10BM (the position corresponding to W1/2 or W2/2), but is a concept in a broad sense including positions deviating to right and left from the center point. That is, "the center position (or the center portion)" is a specific position within the exposed surface 10M (the exposed surface areas 10AM and 10BM) in the width direction, more concretely, a position where the height of the exposed surface area 10BM is the largest. "The peripheral position" is a position on the right or left side of the center position in the width direction, more concretely, is a position where the height of the exposed surface area 10BM is smaller than the largest height (the height T2). As setting dimensions of the exposed surface 10M, for example, the height T of the exposed surface 10M is about 0.2 μm to 0.3 μm, and the height T2 at the center position in the exposed surface area 10BM is about 0.01 μm to 0.1 μm. The exposed surface 10M has a planar shape of quadrangle shape, for example, inverted trapezoidal shape as described above, so that the upper edge E2 in the upper main magnetic pole layer 10B has the largest width in the main magnetic pole layer 10.

Specifically, in the exposed surface 10M, for example, as shown in FIG. 3, the height T2 at the center position in the exposed surface area 10BM is smaller than the height T1 at the center position in the exposed surface area 10AM (T2<T1) and, more concretely, is equal to or less than the half of the height T2 (T2≦T1/2). Moreover, the height of the exposed surface area 10BM is the largest (the height T2) at the center position and gradually decreases with distance from the center position toward the periphery (the height T2P). In this case, for example, the height of the exposed surface area 10BM continuously increases from one end side (for example, the left end side) toward the other end side (for example, the right end side) in the width direction (X-axis direction) so as to be the maximum in the center position and, after that, decreases. More concretely, a boundary line BL provided in the position where the exposed surface area 10AM and the exposed surface area 10BM are adjacent to each other changes to bulge toward the leading side. In association with the fact that the boundary line BL bulges toward the leading side, for example, as shown in FIG. 4, the under face (the face adjacent to the lower main magnetic pole layer 10A) of the upper main magnetic pole layer 10B bulges toward the leading side, and the top face (the face adjacent to the upper main magnetic pole layer 10B) of the lower main magnetic pole layer 10A recedes toward the trailing side.

For example, in the exposed surface 10M, as shown in FIG. 3, when the boundary line BL bulges toward the leading side, the boundary line BL is not in contact with the upper edge E2, that is, a minimum height TMN of the exposed surface area 10BM is larger than zero (TMN>0). Therefore, a part of the outside edge (outline) of the exposed surface area 10BM serves as a part of the side edge E3, and a maximum width WMX of the exposed surface area 10BM is equal to the width W2 of the upper edge E2 (WMX=W2), that is, the exposed surface area 10BM occupies the exposed surface 10M so that the exposed surface area 10AM does not expand to the trailing side.

The insulating layer 9 electrically isolates the auxiliary magnetic pole layer 8 from the periphery and is made of a nonmagnetic insulating material such as alumina. The insulating layer 11 electrically isolates the main magnetic pole layer 10 from the periphery and is made of a nonmagnetic insulating material such as alumina in a manner similar to the insulating layer 9.

The gap layer 12 magnetically isolates between the magnetic pole layer 20 and the write shield layer 30 and, is made of, for example, a nonmagnetic insulating material such as alumina or a nonmagnetic conductive material such as ruthenium (Ru).

The thin film coil 14 generates the magnetic flux for recording and is made of, for example, a high-conductive material such as copper (Cu). The thin film coil 14 has, for example, as shown in FIGS. 1A and 2, a winding structure (spiral structure) in which the thin film coil 14 is wound around the back gap 12BG as a center. FIGS. 1A and 2 show only a part of a plurality of turns constructing the thin film coil 14.

The insulating layer 15 electrically isolates the thin film coil 14 from the periphery by burying the thin film coil 14 and is disposed on the gap layer 12 so as not to close the back gap 12BG. The insulating layer 15 is made of, for example, a nonmagnetic insulating material such as photoresist (photosensitive resin), spin on glass (SOG) or the like displaying flowability when heated. The portions around the edges of the insulating layer 15 form round slopes inclined downward to the edges. The front end position (the edge closest to the air bearing surface 40) of the insulating layer 15 is a "throat height zero position TP" as one of important factors determining recording performance of the thin film magnetic head. The distance between the throat height zero position TP and the air bearing surface 40 is a so-called "throat height TH".

The write shield layer 30 is provided to collect a spread component of the magnetic flux for recording emitted from the magnetic pole layer 20 so as to prevent the magnetic flux for recording from spreading. When the magnetic flux for recording is emitted from the magnetic pole layer 20 toward the recording medium, the magnetic flux transmitted via the recording medium (used for a recording process) is collected and re-supplied to the magnetic pole layer 20, that is, the magnetic flux is circulated between the thin film magnetic head and the recording medium. The write shield layer 30 is disposed on the trailing side of the thin film coil 14, that is, on the trailing side of the magnetic pole layer 20. The write shield layer 30 extends rearward from the air bearing surface 40 to be separated from the magnetic layer 20 via the gap layer 12 on the side close to the air bearing surface 40, and to be magnetically coupled to the magnetic pole layer 20 via the back gap 12BG on the side far from the air bearing surface 40.

In particular, the write shield layer 30, for example, includes two elements constructed as members different from each other, specifically, a TH specifying layer 13 functioning as a main magnetic flux receiving port, and a yoke layer 16 functioning as a passage of the magnetic flux received from the TH specifying layer 13. The write shield layer 30 has a structure in which the TH specifying layer 13 and the yoke layer 16 are adjacent to each other and magnetically coupled to each other.

The TH specifying layer 13 extends from the air bearing surface 40 toward a position between the air bearing surface 40 and the back gap 12BG while being adjacent to the gap layer 12, concretely, toward a position between the air bearing surface 40 and the thin film coil 14. The TH specifying layer 13 is made of, for example, a magnetic material having a high saturated magnetic flux density such as permalloy or iron-cobalt-base alloy and has, as shown in FIG. 2, a planar shape of rectangular shape having a width W4 larger than the width W3 (W4>W3) of the magnetic pole layer 20. The TH specifying layer 13 is adjacent to the insulating layer 15 burying the thin firm coil 14, that is, has the role of specifying the throat height TH by specifying the front end position (throat height zero position TP) of the insulating layer 15.

The yoke layer 16 extends from the air bearing surface 40 to a position corresponding to the back gap 12BG so as to cover the insulating layer 15. The yoke layer 16 rides on the TH specifying layer 13 to be magnetically coupled in the front portion and is adjacent to the magnetic pole layer 20 via the back gap 12BG to be magnetically coupled in the rear portion. The yoke layer 16 is made of, for example, a magnetic material having high-saturated magnetic flux density such as permalloy or iron-cobalt-base alloy in a manner similar to the TH specifying layer 13 and, as shown in FIG. 2, has a planar shape of rectangular shape having the width W4 in a manner similar to the TH specifying layer 13.

The operation of the thin film magnetic head will now be described with reference to FIGS. 1A and 1B to FIG. 3.

In the thin film magnetic head, at the time of recording information, when a current flows from a not-shown external circuit into the thin film coil 14 in the recording head 100B, the magnetic flux for recording is generated by the thin film coil 14. The generated magnetic flux is contained by the magnetic pole layer 20 (the auxiliary magnetic pole layer 8 and the main magnetic pole layer 10) and, after that, flows mainly from the rear end portion 10AB2 toward the front end portion 10AB1 inside of the main magnetic pole layer 10. At the time, the magnetic flux flowing in the main magnetic pole layer 10 is converged while being narrowed at the flare point FP as the width of the main magnetic pole layer 10 decreases. The magnetic flux is finally concentrated on the front end portion 10B1 in the main magnetic pole layer 10 (the lower main magnetic layer 10A and the upper main magnetic layer 10B), thereby being concentrated on the area of the trailing edge TE in the exposed surface 10M. When the magnetic flux concentrated on the area of the trailing edge TE is emitted to the outside to generate a recording magnetic field (perpendicular magnetic field) in the direction orthogonal to the surface of a recording medium, the recording medium is magnetized by the perpendicular magnetic field so that information is magnetically recorded onto the recording medium.

At the time of recording information, a spread component of the magnetic flux emitted from the magnetic pole layer 20 is received by the write shield layer 30, so that the spread of the magnetic flux is suppressed. The magnetic flux received by the write shield layer 30 is circulated into the magnetic pole layer 20 via the back gap 12BG.

On the other hand, at the time of reproducing information, when a sense current flows to the MR device 6 of the reproducing head portion 100A, the resistance value of the MR device 6 changes according to a signal magnetic field for reproduction based on the recording medium so that a resistance change of the MR device 6 is detected as a change in the sense current, thereby reproducing magnetically information recorded in the recording medium.

As a method of manufacturing a thin film magnetic head according to the embodiment of the present invention, with reference to FIGS. 1A and 1B to FIG. 10, a method of manufacturing the thin film magnetic head shown in FIGS. 1A and 1B to FIG. 4 will now be described. FIGS. 5 to 10 show processes of manufacturing the thin film magnetic head, and each of the figures shows an enlarged partial sectional configuration of FIG. 1A.

In the following, first, an outline of the processes of manufacturing a whole thin film magnetic head will be described with reference to FIG. 1A and FIG. 1B. After that, with reference to FIGS. 1A and 1B to FIG. 10, processes of forming a main portion (the main magnetic pole layer 10 (the lower main magnetic pole layer 10A and the upper main magnetic pole layer 10B)) of the thin film magnetic head to which the method of manufacturing of the thin film magnetic head according to the embodiment of the present invention is applied will be described. Since the materials, dimensions, and structural features of the series of the components of the thin film magnetic head have already been described in detail, the description will not be repeated.

The thin film magnetic head is manufactured by sequentially forming and stacking the components by mainly using an existing thin film processing including a film forming technique such as plating or sputtering, a patterning technique such as photolithography process, and an etching technique such as dry etching or wet etching. Specifically, at the time of manufacturing the thin film magnetic head, first, as shown in FIG. 1A and 1B, the insulating layer 2 is formed on the substrate 1 and, after that, the lower read shield layer 3, the shield gap film 4 in which the MR device 6 is buried, and the upper shield layer 5 (the upper read shield layer portion 5A, the nonmagnetic layer 5B and the upper read shield layer portion 5C) are stacked on the insulating layer 2 in accordance with this order, thereby forming the reproducing head portion 100A. Subsequently, the isolation layer 7 is formed on the reproducing head portion 100A. On the isolation layer 7, the magnetic pole layer 20 (the auxiliary magnetic pole layer 8 and the main magnetic pole layer 10) whose periphery is buried by the insulating layers 9 and 11, the gap layer 12, the thin film coil 14 buried by the insulating layer 15, and the write shield layer 30 (the TH specifying layer 13 and the yoke layer 16) are stacked in this order, thereby forming the recording head portion 100B. Finally, the overcoat layer 17 is formed on the recording head portion 100B and, after that, the air bearing surface 40 is formed by using machining process and polishing process, thereby completing the thin film magnetic head.

At the time of forming the main magnetic pole layer 10 (the lower main magnetic pole layer 10A and the upper main magnetic pole layer 10B) of the thin film magnetic head, as shown in FIGS. 1A and 1B, the insulating layer 9 is formed so as to bury the periphery of the auxiliary magnetic pole layer 8.

Figure 5:
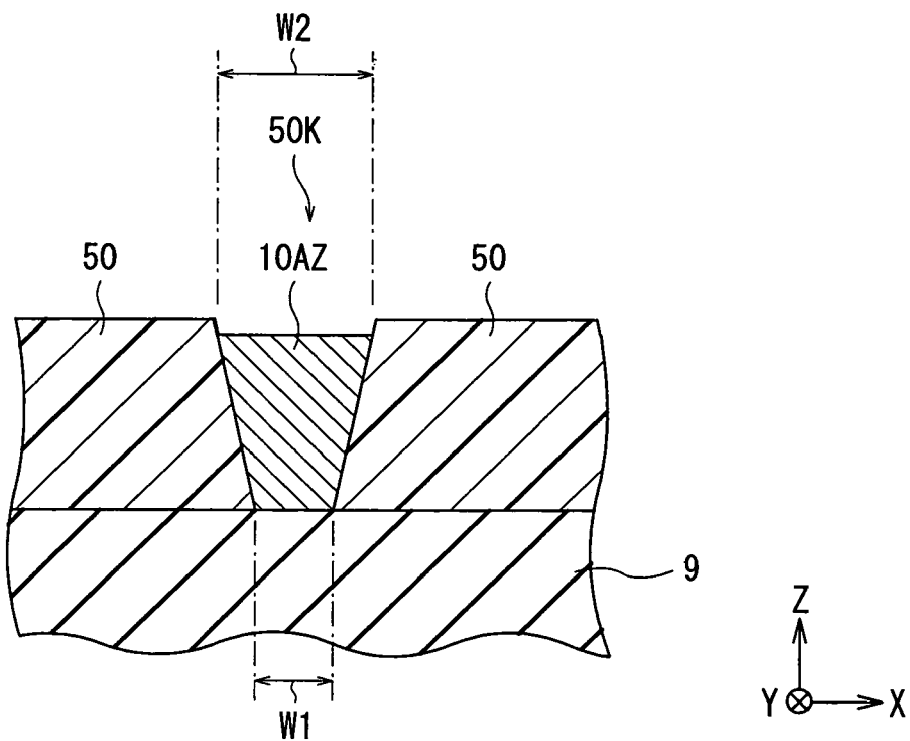
FIG. 5 is a cross section illustrating a process of a manufacturing method of the thin film magnetic head according to the embodiment of the invention.

After that, on the auxiliary magnetic pole layer 8 and the insulating layer 9, first, as shown in FIG. 5, a photoresist pattern 50 is formed. The photoresist pattern 50 is formed so as to have, for example, an opening 50K corresponding to the shape of the main magnetic pole layer 10 formed in a post process (the shape of a pre-magnetic pole layer 10AZ to be formed in a post process; refer to FIG. 5). More concretely, the opening width of the opening 50K gradually decreases toward the insulating layer 9 in correspondence with the planar shape of the exposed surface 10M shown in FIG. 3. The width of the opening 50K is equal to the width W1 of the lower edge E1 at the lower end and is larger than the width W2 of the upper edge E2 at the upper end. An example of a concretely procedure of forming the photoresist pattern 50 is that a photoresist film (not shown) is formed by applying photoresist on the surface of the insulating layer 9 and, after that, the opening 50K is formed by patterning (exposure and development) the photoresist film by using a photolithography process, thereby forming the photoresist pattern 50 provided with the opening 50K.

Subsequently, as shown in FIG. 5, the pre-magnetic pole layer 10AZ (the first pre-magnetic pole portion) for forming the lower main magnetic pole layer 10A is formed in the opening 50K provided in the photoresist pattern 50 by using a magnetic material having a relatively low saturated magnetic flux density S1, concretely, iron cobalt nickel alloy (FeCoNi) or the like. The pre-magnetic layer 10AZ is a preparation layer which becomes the lower main magnetic pole layer 10A by being etched in a post process. In this case, in correspondence with the shape of the opening 50K described above, the pre-magnetic pole layer 10AZ is formed so as to have a sectional shape corresponding to the shape of the main magnetic layer 10, that is, the inverted trapezoidal shape which is bilaterally symmetrical. At the time of forming the pre-magnetic pole layer 10AZ, for example, a forming material (magnetic material) whose etching speed (so-called etching rate) for dry etching such as ion milling is higher than that of a forming material (insulating material) of the insulating layer 11 to be formed in a post process is used. A width of the top end is set almost equal to the width W2 of the upper edge E2 shown in FIG. 3. Specifically, in a procedure of forming the pre-magnetic pole layer 10AZ, for example, a material similar to that of the pre-magnetic pole layer 10AZ is used to grow a plating film by using a seed layer as an electrode film, thereby forming the pre-magnetic pole layer 10AZ in the opening 50K. At the time of growing the plating film, for example, the seed layer is formed in advance on the insulating layer 9 and the photoresist pattern 50 is formed on the seed layer, thereby making the plating film grow by using the seed layer exposed on the opening 50K.

Figure 6:
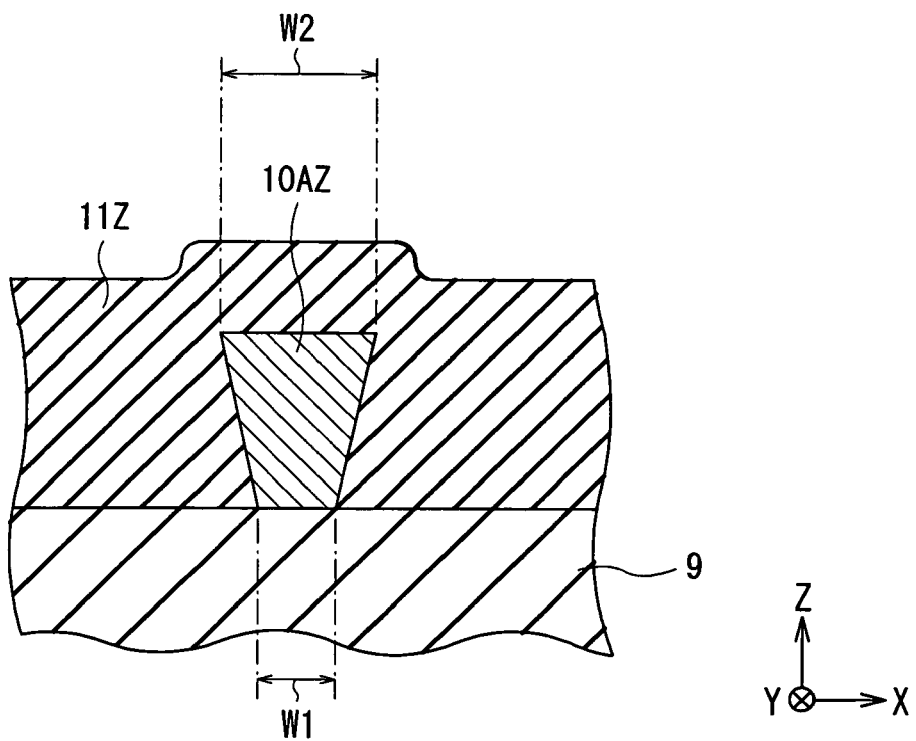
FIG. 6 is a cross section illustrating a process subsequent to FIG. 5

After the photoresist pattern 50 is removed and the pre-magnetic pole layer 10AZ is left, as shown in FIG. 6, a pre-insulating layer 11Z is formed so as to cover the pre-magnetic pole layer 10AZ and the insulating layer 9 in the periphery of the pre-magnetic pole layer 10AZ. The pre-insulating layer 11Z is a preparation layer which becomes the insulating layer 11 by being polished in a post process. The pre-insulating layer 11Z is formed so that, for example, its surface becomes higher than the surface of the pre-magnetic pole layer 10AZ, that is, the pre-magnetic pole layer 10AZ is completely buried. In a procedure of forming the pre-insulating layer 11Z, for example, the pre-insulating layer 11Z is formed by using the forming material of the insulating layer 11 by sputtering.

Figure 7:
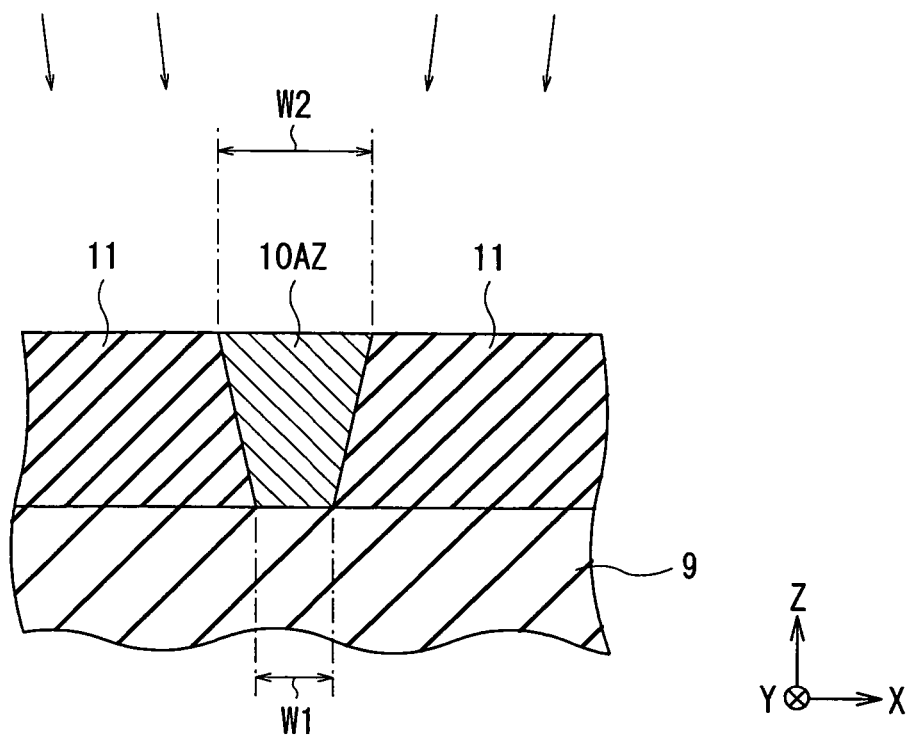
FIG. 7 is a cross section illustrating a process subsequent to FIG. 6.

Subsequently, at least the pre-insulating layer 11Z is polished and planarized until the pre-magnetic pole layer 10AZ is exposed, more concretely, the pre-magnetic pole layer 10AZ is polished and planarized together with the pre-insulating layer 11Z as necessary, thereby forming the insulating layer 11 so as to bury the periphery of the pre-magnetic pole layer 10AZ as shown FIG. 7. In a procedure of forming the insulating layer 11, for example, the pre-insulating layer 11Z is polished by using chemical mechanical polishing (CMP) method, thereby forming the insulating layer 11.

Figure 8:
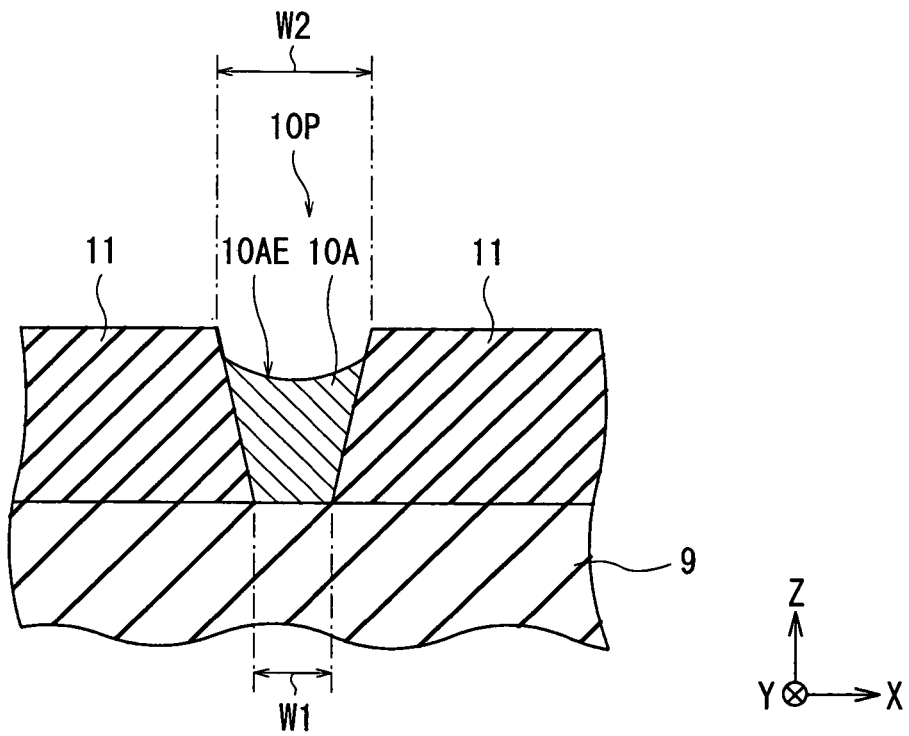
FIG. 8 is a cross section illustrating a process subsequent to FIG. 7.

Subsequently, by partially etching the pre-magnetic pole layer 10AZ from the trailing side, as shown in FIG. 8, the lower main magnetic pole layer 10A constructing a part of the main magnetic pole layer 10 is formed. At the time of forming the lower main magnetic pole layer 10A, for example, by using dry etching such as the ion milling, an etching process is performed while obliquely emitting ion beams (directions inclined from a perpendicular line (a line parallel with the Z axis) to the extending surface (XY surface) of the pre-magnetic pole layer 10AZ). In the case, due to the existence of the insulating layer 11, having a relatively low etching rate around the pre-magnetic pole layer 10AZ having a relatively high etching rate, only the pre-magnetic pole layer 10AZ is selectively etched by using the difference between the etching rates. Consequently, a magnetic pole forming area 10P for forming the upper main magnetic pole layer 10B in a post process is defined so as to be surrounded by the lower main magnetic pole layer 10A and the insulating layer 11. In this case, in particular, the insulating layer 11 surrounding the pre-magnetic pole layer 10AZ functions as a barrier which disturbs etching action (the progress in etching process) on the pre-magnetic pole layer 10AZ, so that the amount of etching on the pre-magnetic pole layer 10AZ is largest at a center position and gradually decreases with distance from the center position toward the periphery. Consequently, the lower main magnetic pole layer 10A is formed so as to have a section shape corresponding to the planar shape of the exposed surface area 10AM shown in FIG. 3. Specifically, when the exposed surface area 10AM is formed in a post process, as shown in FIG. 3, the lower main magnetic pole layer 10A is formed so that the height T1 at the center position of the exposed surface area 10AM is smaller than the height T1P of the exposed surface area 10AM at an arbitrary periphery position around the center position (T1<T1P). In this case, for example, the etched surface of the pre-magnetic pole layer 10AZ, that is, a top surface 10AE of the lower main magnetic pole layer 10A bends so as to recede toward the trailing side.

Figure 9:
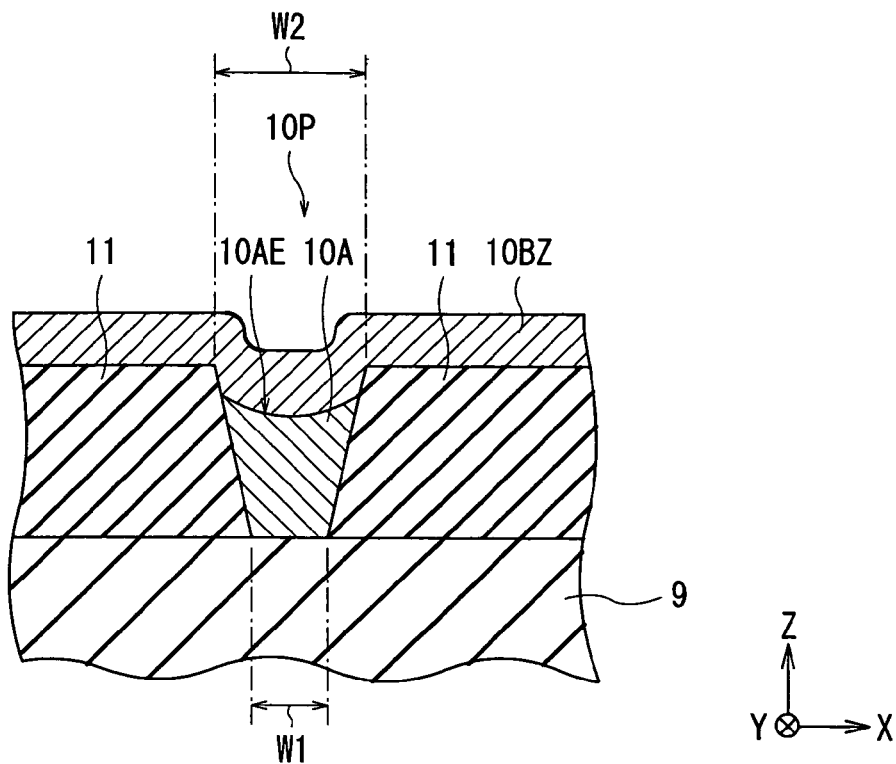
FIG. 9 is a cross section illustrating a process subsequent to FIG. 8.

Subsequently, as shown in FIG. 9, a magnetic material having the relatively high saturated magnetic flux density S2, concretely, iron-cobalt-base alloy or the like, is used to bury at least the magnetic pole forming area 10P defined by the lower main magnetic layer 10A and the insulating layer 11, more concretely, the pre-magnetic pole layer 10BZ (the second pre-magnetic pole portion) for forming the upper main magnetic pole layer 10B is formed so as to bury the magnetic pole forming area 10P and cover the insulating layer 11 in the periphery. The pre-magnetic pole layer 10BZ is a preparation layer which becomes the upper main magnetic pole layer 10B by being polished in a post process. The pre-magnetic pole layer 10BZ is formed so that, for example, the surface is higher than the surface of the insulating layer 11. The pre-magnetic pole layer 10BZ is formed by performing a film forming process on the whole by using, for example, sputtering.

Figure 10:
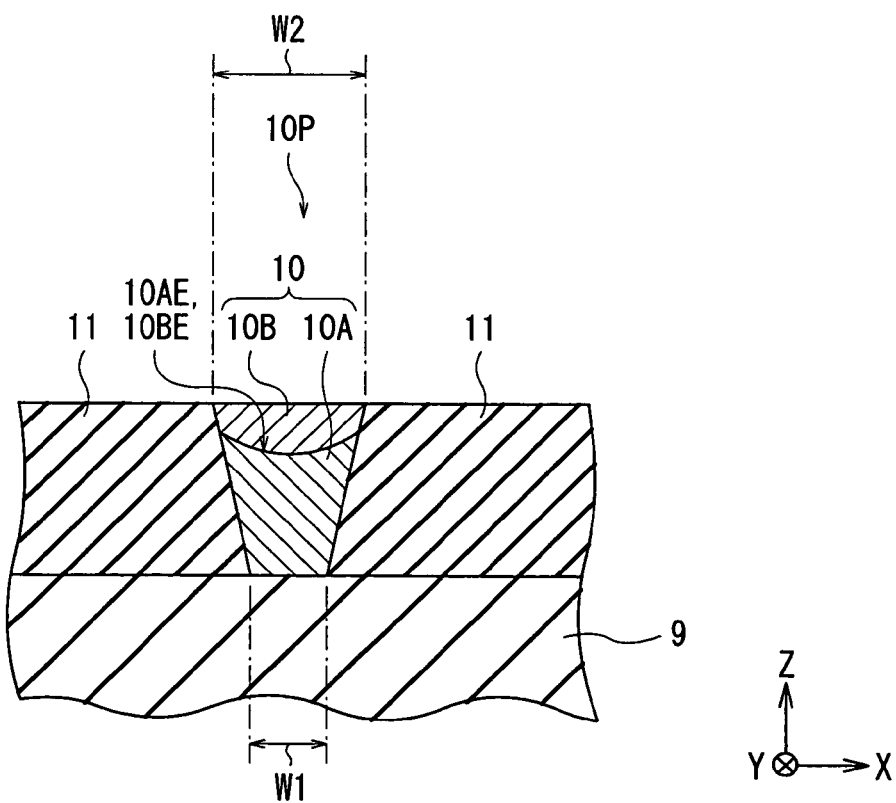
FIG. 10 is a cross section illustrating a process subsequent to FIG. 9.

Subsequently, at least the pre-magnetic pole layer 10BZ is polished until the insulating layer 11 is exposed, more concretely, the pre-magnetic pole layer 10BZ is polished and planarized together with the insulating layer 11 as necessary, thereby forming the upper main magnetic pole layer 10B as another portion of the main magnetic layer 10 in the magnetic pole forming area 10P as shown in FIG. 10. At the time of forming the upper main magnetic pole layer 10B, for example, the pre-magnetic pole layer 10BZ is polished by using the CMP method. In this case, the upper main magnetic pole layer 10B is formed in the magnetic pole forming area 10P defined by the lower main magnetic pole layer 10A and the insulating layer 11, so that the upper main magnetic pole layer 10B having a section shape corresponding to the planar shape of the exposed surface area 10BM shown in FIG. 3 is formed. That is, when the exposed surface area 10BM is formed in a post process, as shown in FIG. 3, the upper main magnetic pole layer 10B is formed so that the height T2 at the center position in the exposed surface area 10BM is larger than the height T2P at an arbitrary peripheral position around the center position in the exposed surface area 10BM (T2>T2P). For example, in association with the fact that the upper main magnetic pole layer 10B is formed along the upper surface 10AE of the lower main magnetic pole layer 10A, the surface of the upper main magnetic pole layer 10B adjacent to the lower main magnetic pole layer 10A, that is, the lower surface 10BE of the upper main magnetic pole layer 10B bulges toward the leading side.

Finally, as described above, at least the lower main magnetic pole layer 10A and the upper main magnetic pole layer 10B are processed by using machining or polishing, more concretely, the air bearing surface 40 is formed by processing the stacking structure (the series of stacked structures from the substrate 1 to the overcoat layer 17) which includes the lower main magnetic pole layer 10A and the upper main magnetic pole layer 10B. As shown in FIGS. 1A and 1B to FIG. 4, the exposed surface 10M is formed so as to compose a part of the air bearing surface 40. That is, the exposed surface area 10AM of the lower main magnetic pole layer 10A and the exposed surface area 10BM of the upper main magnetic pole layer 10B are formed. As a result, the main magnetic pole layer 10 is constructed so as to have a stacking structure where the lower main magnetic pole layer 10A having the exposed surface area 10AM positioned on the leading side and the upper main magnetic pole layer 10B having the exposed surface area 10BM positioned on the trailing side are adjacent to each other and stacked, thereby finishing the forming process of the main magnetic pole layer 10. In the main magnetic pole layer 10, the exposed surface 10M has a planar shape of the bilaterally-symmetrical inverted-trapezoidal shape, that is, the width W2 of the upper edge E2 is larger than the width W1 of the lower edge E1 (W2>W1), and is equal to or larger than the width WD of the exposed surface 10M at an arbitrary intermediate position between the lower edge E1 and the upper edge E2 (W2>WD). The height T2 at the center position in the exposed surface area 10BM is larger than height T2P in the exposed surface area 10BM at an arbitrary position around the center position (T2>T2P). In the process of forming the upper main magnetic pole layer 10B described above, for example, by polishing the insulating layer 11 as necessary together with the pre-magnetic pole layer 10BZ, the amount of polishing is adjusted so that the exposed surface has a height T, that is, the sum of the height T1 at the center position in the exposed surface area 10AM and the height T2 at the center position in the exposed surface area 10BM becomes equal to the height T (T=T1+T2).

The thin film magnetic head according to the embodiment has a stacking structure wherein the lower main magnetic pole layer 10A having the relatively low saturated magnetic flux density S1 positions on the leading side and the upper main magnetic pole layer 10B having the relatively high saturated magnetic flux density S2 (S2>S1) positions on the trailing side. The exposed surface 10M has a planar shape of the bilaterally-symmetrical inverted-trapezoidal shape where the width W2 of the upper edge E2 is larger than the width W1 of the lower edge E1 (W2>W1) and is equal to or larger than the width WI) of the exposed surface 10M at an arbitrary intermediate position between the lower edge E1 and the upper edge E2 (W2≧WD). In particular, the main magnetic pole layer. 10 is constructed so that the height T2 at the center position of the exposed surface area 10BM is larger than the height T2P of the exposed surface area 10BM at an arbitrary peripheral position around the center position. Consequently, for the following reason, by satisfying both assurance of the strength of the perpendicular magnetic field and reduction in the record track width, the record performance can be improved.

Figure 11:
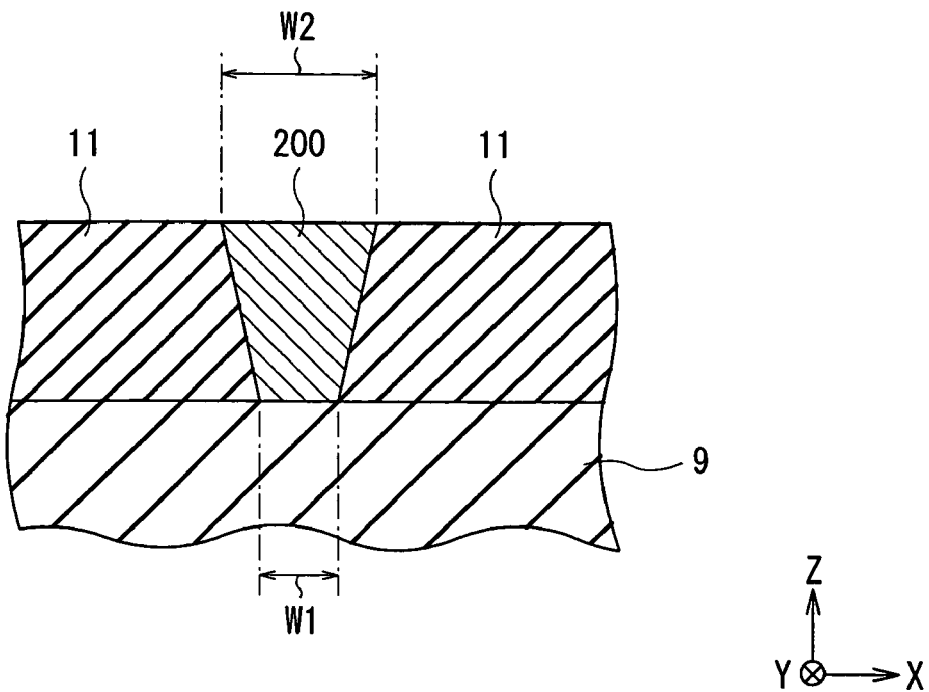
FIG. 11 is a cross section showing a sectional configuration of a thin film magnetic head as a first comparative example of the thin film magnetic head according to the embodiment of the invention.
Figure 12:
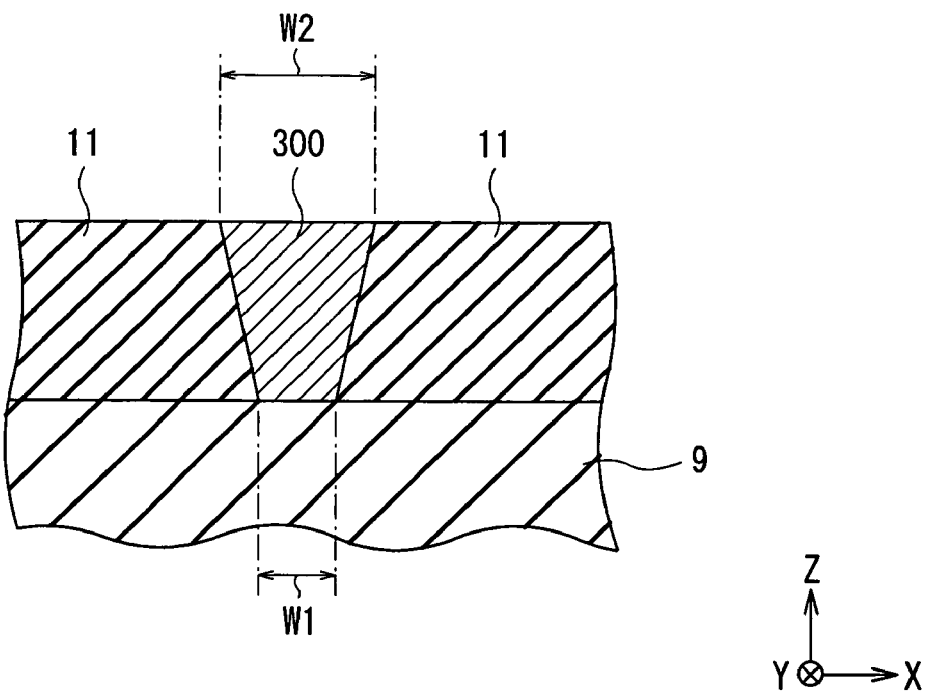
FIG. 12 is a cross section showing a sectional configuration of a thin film magnetic head as a second comparative example of the thin film magnetic according to the embodiment of the invention.

FIGS. 11 and 12 show configurations of the thin film magnetic head as a comparative example of the thin film magnetic head according to the embodiment. FIG. 11 shows a thin film magnetic head of a first comparative example. FIG. 12 shows a thin film magnetic head of a second comparative example. Each of FIGS. 11 and 12 shows a sectional configuration corresponding to FIG. 10. The thin film magnetic head of the first comparative example shown in FIG. 11 has a structure similar to that of the thin film magnetic head according to the embodiment except for the following point. The thin film magnetic head of the first comparative example has, in-place of the main magnetic pole layer 10 having a stacking structure including the lower main magnetic pole layer 10A having the relatively low saturated magnetic flux density S1 and the upper main magnetic pole layer 10B having the relatively high saturated magnetic flux density S2, a main magnetic pole layer 200 of a single layer structure having the relatively low saturated magnetic flux density S1 as a whole. The thin film magnetic head of the second comparative example shown in FIG. 12 has a structure similar to that of the thin film magnetic head according to the embodiment except for the following point. The thin film magnetic head of the second comparative example has, in place of the main magnetic pole layer 10 that have a stacking structure including the lower main magnetic pole layer 10A having the relatively low saturated magnetic flux density S1 and the upper main magnetic pole layer 10B having the relatively high saturated magnetic flux density S2, a main magnetic pole layer 300 of a single layer structure having the relatively high saturated magnetic flux density S2 as a whole.

In the thin film head of the first comparative example (refer to FIG. 11), on the basis of the fact that the main magnetic pole layer 200 has the relatively low saturated magnetic flux density S1 as a whole, the magnetic volume of the main magnetic pole layer 200 is not too large as a whole, more concretely, a magnetic flux of recording is not easily concentrated on corner portions at both ends on the trailing side of the main magnetic pole layer 200, so that occurrence of a fringe phenomenon (a phenomenon of spread of magnetic flux) is suppressed when the magnetic flux for recording is emitted from the main magnetic pole layer 200. As a result, increase in the recording track width due to the fringe phenomenon of the magnetic flux in the information recording operation is suppressed so that an advantage is obtained from the view point that the recording track width narrows.

However, in the thin film magnetic head of the first comparative example, as described above, due to the fact that the main magnetic pole layer 200 has the relatively low saturated magnetic flux density S1 as a whole, a sufficient magnetic volume of the front end portion (a portion corresponding to the front end portion 10B1 in the upper main magnetic pole layer 10B) in the main magnetic pole layer 200 as a part emitting a main magnetic flux cannot be obtained. More concretely, in the case of narrowing the width of the front end portion in the main magnetic pole layer 200 in order to narrow the recording track width, a sufficient magnetic volume of the front end potion cannot be obtained so that the amount of magnetic flux emitted from the main magnetic pole layer 200 decreases. As a result of this, a problem occurs such that the strength of perpendicular magnetic field is insufficient in the information recording operation.

From the above, in the thin film magnetic head of the first comparative example, the advantage that the recording track width is narrowed in the information recording operation is obtained. On the other hand, the problem occurs such that the strength of the perpendicular magnetic field is insufficient. It is therefore difficult to improve the recording performance by satisfying both assurance of the perpendicular magnetic field strength and reduction in the record track width.

In the thin film magnetic head of the second comparative example (refer to FIG. 12), based on the fact that the main magnetic pole layer 300 has the relatively high saturated magnetic flux density S2 as a whole, the magnetic volume of the front end portion of the main magnetic pole layer 300 (the portion corresponding to the front end portion 10B1 in the upper main magnetic pole layer 10B), as a main magnetic flux emitting part is sufficient. More concretely, also in the case of narrowing the width of the front end portion in the magnetic pole layer 300 in order to narrow the recording track width, the magnetic volume of the front end portion is sufficient so that the amount of magnetic flux emitted from the main magnetic pole layer 300 increases. As a result of this, the advantage that the perpendicular magnetic field strength is assured in the information recording operation is obtained.

In the thin film magnetic head of the second comparative example, however, as describe above, due to the fact that the main magnetic pole layer 300 has the relatively high saturated magnetic flux density S2 as a whole, the magnetic volume of the main magnetic pole layer 300 is too large as a whole. More concretely, the magnetic flux for recording tends to be concentrated on the potions of both end corners on the trailing side in the main magnetic pole layer 300 so that a fringe phenomenon easily occurs when the magnetic flux for recording is emitted from the main magnetic pole layer 300. As a result, a problem occurs such that the recording track width tends to increase due to the fringe phenomenon of the magnetic flux in the information recording operation.

From the above, in the thin film magnetic head of the second comparative example, the advantage that the perpendicular magnetic field strength is assured in the information recording operation is obtained. On the other hand, the problem occurs that the recording track width tends to increase. Consequently, it is difficult to improve the recording performance by satisfying both assurance of the perpendicular magnetic field strength and reduction in the recording track width.

In contrast, in the thin film magnetic head according to the embodiment (refer to FIGS. 3 and 10), the main magnetic pole layer 10 has the stacking structure including the lower main magnetic pole layer 10A which positions on the leading side and has the relatively low saturated magnetic flux density S1 and the upper main magnetic pole layer 10B which positions on the trailing side and has the relatively high saturated magnetic flux density S2. That is, based on the fact that the upper main magnetic pole layer 10B has the relatively high saturated magnetic flux density S2, a sufficient magnetic volume is obtained in the front end portion of the main magnetic pole layer 10 as a main magnetic flux emitting part (the front end portion 10B1 in the upper main magnetic pole layer 10). More concretely, also in the case where the width of the front end portion in the main magnetic pole layer 10 is narrowed in order to narrow the recording track width, the magnetic volume of the front end portion is sufficient. As a result, the amount of the magnetic flux emitted from the main magnetic pole layer 10 increases in spite of the fact that the lower main magnetic pole layer 10A has the relatively low saturated magnetic flux density S1. In this case, particularly, the height T2 at the center position in the exposed surface area 10BM in the upper main magnetic pole layer 10B is larger than the height T2P in the exposed surface area 10BM at a peripheral position around the center position (T2>T2P). That is, based on the fact that the central area in the exposed surface area 10BM partly projects to the leading side, the area occupied by the upper main magnetic pole layer 10B in the main magnetic pole layer 10 locally increases only by the projection amount (the magnetic volume of the upper main magnetic pole layer 10B locally increases), so that the amount of magnetic flux emitted from the main magnetic pole layer 10 markedly increases. As a result of this, the advantage that the perpendicular magnetic field strength is assured in the information recording operation is obtained.

Moreover, in the thin film magnetic head according to the embodiment, as stated above, the central area in the exposed surface area 10BM in the upper main magnetic pole layer 10B partly projects to the leading side. That is, the area in the periphery of the central area in the exposed surface area 10BM partly recedes to the trailing side from the central area. Consequently, the area occupied by the upper main magnetic pole layer 10B in the main magnetic pole layer 10 locally decreases (the magnetic volume of the upper main magnetic pole layer 10B locally decreases). In this case, the magnetic volume of the upper main magnetic pole layer 10B is not too large. More concretely, the magnetic flux for recording does not tend to be concentrated on the portions of both edge corners on the trailing side in the main magnetic pole layer 10, so that occurrence of the fringe phenomenon is suppressed at the time that the magnetic flux for recording is emitted from the main magnetic pole layer 10. As a result of this, increase in the recording track width caused by the fringe phenomenon of magnetic flux is suppressed in the information recording operation. Thus, the advantage that the recording track width is reduced can be obtained.

Therefore, in the thin film magnetic head according to the embodiment, the advantage that assurance of the perpendicular magnetic field strength in the information recording operation is obtained and, in addition, the advantage that increase in the recording track width is suppressed is also obtained. Consequently, recording performance can be improved by satisfying both assurance of the perpendicular magnetic field strength and reduction in the recording track width.

The significance from the technical viewpoint of the thin film magnetic head according to the embodiment of the invention will now be described. Specifically, the structural characteristics of the thin film magnetic head according to the embodiment are as follows. When the main magnetic pole layer 10 is constructed so that the exposed surface 10M has a planar shape of the bilaterally-symmetrical inverted-trapezoidal shape, the main magnetic pole layer 10 is constructed so as to have a stacking structure wherein the lower main magnetic pole layer 10A having the relatively low saturated magnetic flux density S1 positions on the leading side and the upper main magnetic pole layer 10B having the relatively high saturated magnetic flux density S2 positions on the trailing side. In particular, the height T2 at the center position in the exposed surface area 10BM is larger than the height T2P in the exposed surface area 10BM at an arbitrary peripheral position around the center position (T2>T2P). More concretely, as shown in FIG. 3, the height T2 at the center position in the exposed surface area 10BM is smaller than the height T1 at the center position in the exposed surface area 10AM (T2<T1).

With respect to the structural characteristics of the main magnetic pole layer 10, first, the reason why it is preferable that the height T2 at the center position in the exposed surface 10BM be larger than the height T2P in the exposed surface area 10BM at an arbitrary peripheral position around the center point (T2>T2P) that, as described above, by controlling the magnetic volume of the upper main magnetic pole layer 10B, both of assurance of the perpendicular magnetic field strength and reduction in the record track width are satisfied. In more detail, in the case of focusing attention on the magnetic volume of the upper main magnetic pole layer 10B having the relatively high saturated magnetic flux density S2, that is, largely contributing to the magnetic volume of the overall main magnetic pole layer 10, in order to increase the perpendicular magnetic field strength while suppressing that the fringe phenomenon of the magnetic flux becomes salient, the magnetic volume of the upper main magnetic pole layer 10B has to be controlled in the following manner. While increasing the magnetic volume of the upper main magnetic pole layer 10B by making the height T2 at the center position in the exposed surface area 10BM relative large, the magnetic volume of the upper main magnetic pole layer 10B is decreased by making the height T2P at the periphery position in the exposed surface area 10BM relative small.

Second, it is preferable that the height T2 at the center position in the exposed surface area 10BM be smaller than the height T1 at the center position in the exposed surface area 10AM (T2<T1) for the following reason. When the height T2 is equal to or larger the height T1 (T2≧T1), the proportion of the upper main magnetic pole layer 10B in the main magnetic pole layer 10, that is, the proportion of where the upper main magnetic pole layer 10B having the relative high saturated magnetic flux density S2 is too large. Consequently, the recording track width is easily increased while assuring the strength of the perpendicular magnetic field in a manner similar to the above-described case of the thin film magnetic head according to the second comparative example.

Third, it is preferable that the exposed surface 10M have a planar shape of the bilaterally-symmetrical inverted-trapezoidal shape, that is, the width W2 of the upper edge E2 in the exposed surface 10M be larger than the width W1 of the lower edge E1 and is equal to or larger than the width WD of the exposed surface 10M at the arbitrary intermediate position between the lower edge E1 and the upper edge E2 (W2>W1, W2≧WD) for the following reason. When the exposed surface 10M in the main magnetic pole layer 10 has a planar shape of the bilaterally-symmetrical inverted-trapezoidal shape, a skew occurs in a recording operation of the thin film magnetic head. Specifically, even in the case where the main magnetic pole layer 10 is inclined from the tangential direction of a track to be recorded (a specific track to which information is to be recorded) provided in a curving line shape in the recording medium, the exposed surface 10M in the main magnetic pole layer 10 does not extend off the track to be recorded into an adjacent track (another track adjacent to the track to be recorded). Consequently, magnetization of not only the track to be recorded but also the adjacent track (unintentional erasure of information recorded on the recording medium due to a skew) by the perpendicular magnetic field at the time of information recording operation is suppressed.

Consequently, the thin film magnetic head according to the embodiment has the significance from technical viewpoint that unintentional erasure of information recorded on the recording medium due to a skew is suppressed while satisfying both assurance of the strength of the perpendicular magnetic field and reduction in the recording track width.

In addition, in the method of manufacturing the thin film magnetic head according to the embodiment, the pre-magnetic pole layer 10AZ is formed by using the magnetic material having the relatively low saturated magnetic flux density S1, and then the pre-magnetic pole layer 10AZ is partly etched from the trailing side to form the lower main magnetic pole layer 10A. After that, the upper main magnetic pole layer 10B is formed on the lower main magnetic pole layer 10A by using the magnetic material having relatively high saturated magnetic flux density S2 (S2>S1), thereby forming the main magnetic pole layer 10 (the lower main magnetic pole layer 10A and the upper main magnetic pole layer 10B). In order to form the main magnetic pole layer 10, only existing thin film processes including a film forming technique, a patterning technique and an etching technique are used, but novel and complicated manufacturing processes are not used. Therefore, the thin film magnetic head in which recording performance is improved by satisfying both assurance of the perpendicular magnetic field strength and reduction in the recording track width can be easily manufactured.

In the embodiment of the invention, as shown in FIG. 3, with respect to the structure of the exposed surface 10M (the exposed surface areas 10AM and 10BM), in the case where the boundary line BL bulges toward the leading side, the boundary line BL is not in contact with the upper edge E2, the minimum height TMN of the exposed surface area 10BM is larger than zero (TMN>0), and the maximum width WMX of the exposed surface area 10BM is equal to the width W2 of the upper edge E2 (WMX=W2). However, the invention is not limited to the case. The minimum height TMN and the maximum width WMX can be freely changed.

Figure 13:
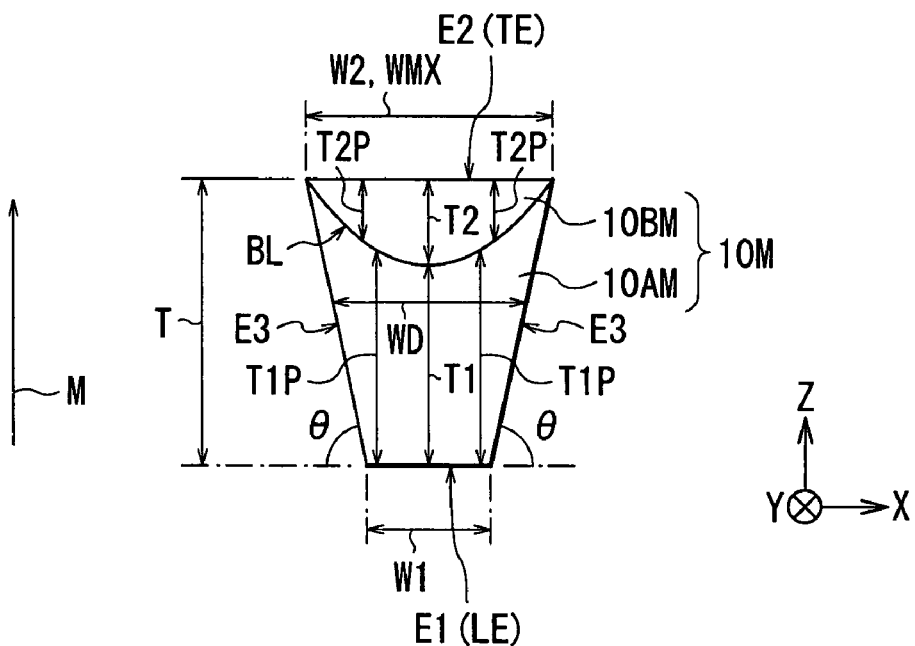
FIG. 13 is a cross section showing a modification of the configuration of the exposed surface in the main magnetic pole layer.

Concretely, for example, as shown in FIG. 13, by making the boundary line BL in contact with the upper edge E2, that is, by setting the smallest height TMN of the exposed surface 10BM to be equal to zero (TMN=0), a part of the outside edge (outline) of the exposed surface area 10BM is allowed not to include a part of the side edge E3. In the case shown in FIG. 13, the maximum width WMX of the exposed surface area 10BM is equal to the width W2 of the upper edge E2 (WMX=W2) in a manner similar to the case shown in FIG. 3. In this case as well, effects similar to those obtained in the foregoing embodiment shown in FIG. 3 can be obtained. In particular, when the minimum height TMN of the exposed surface area 10BM is set to zero (TMN=0), in comparison with the case where the minimum height TMN is larger than zero (TMN>0; refer to FIG. 3), concentration of the magnetic flux for recording on the corners at both ends on the trailing side of the main magnetic pole layer 10 is further suppressed. Thus, increase in the recording track width due to the fringe phenomenon of the magnetic flux in the information recording operation can be further suppressed. The structural characteristics of the exposed surface 10M shown in FIG. 13 other than the above are similar to those shown in FIG. 3.

Figure 14:
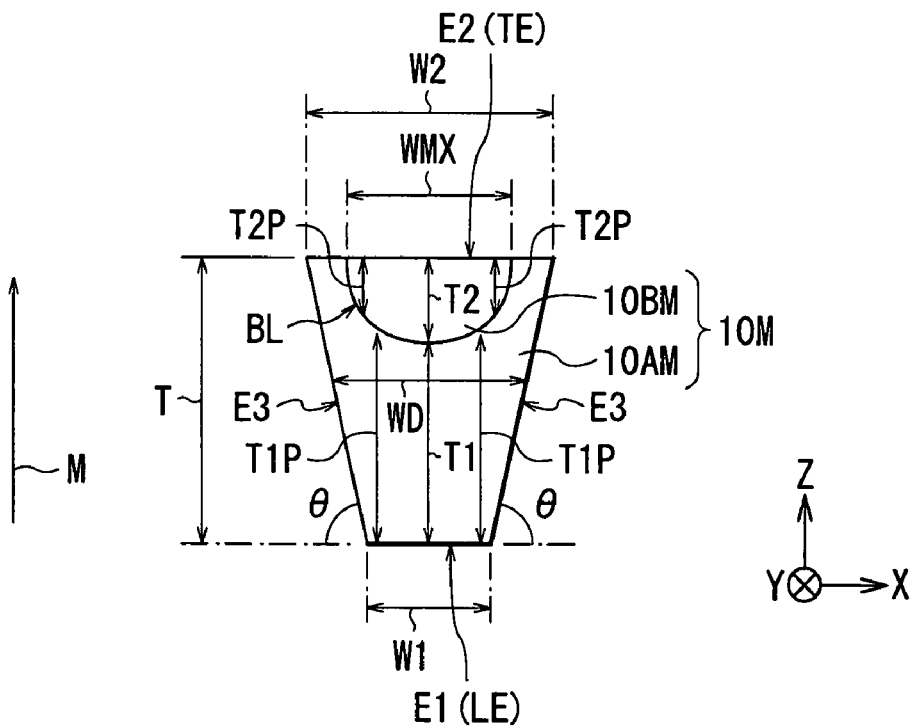
FIG. 14 is a cross section showing another modification of the configuration of the exposed surface in the main magnetic pole layer.

For example, as shown in FIG. 13, when the boundary line BL is in contact with the upper edge E2, as shown in FIG. 14, the maximum width WMX of the exposed surface area 10BM may be smaller than the width W2 of the upper edge E2 (WMX<W2). In this case as well, effects similar to those of the foregoing embodiment shown in FIG. 3 can be obtained.

The structural characteristics of the exposed surface 10M shown in FIG. 14 other than the above are similar to those shown in FIG. 13.

Figure 15:
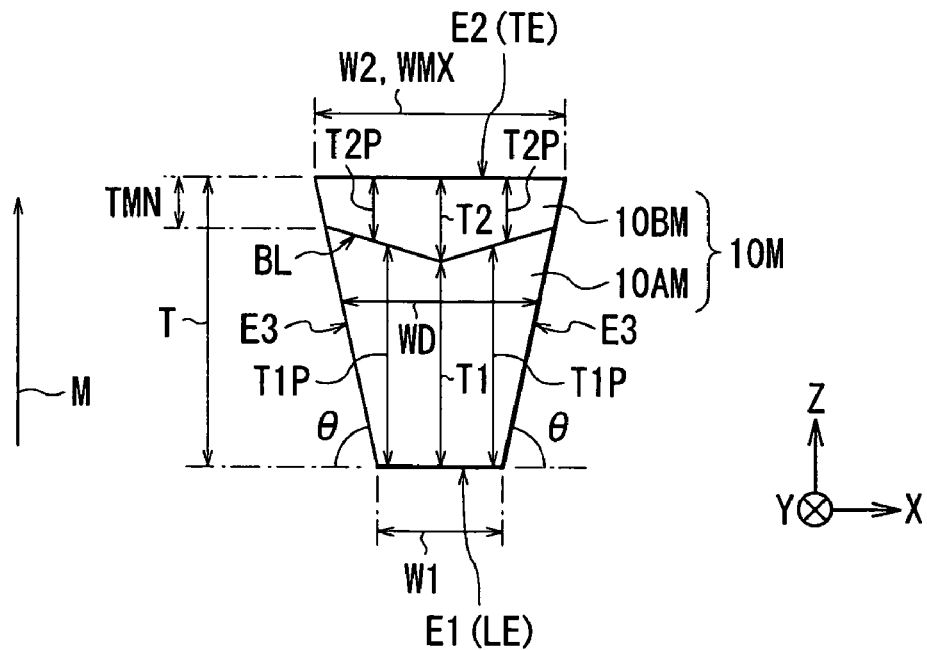
FIG. 15 is a cross section showing still another modification of the configuration of the exposed surface in the main magnetic pole layer.

Further, for example, as shown in FIG. 15, the boundary line BL may not curve but may extend linearly with a bend. In the case shown in FIG. 15, the boundary line BL bends only once via one bending point. However, the number of bending times of the boundary line BL (the number of bending points) can be freely set. In this case as well, effects similar to those of the foregoing embodiment shown in FIG. 3 can be obtained. The structural characteristics of the exposed surface 10M shown in FIG. 15 other than the above are similar to those shown in FIG. 3.

Figure 16:
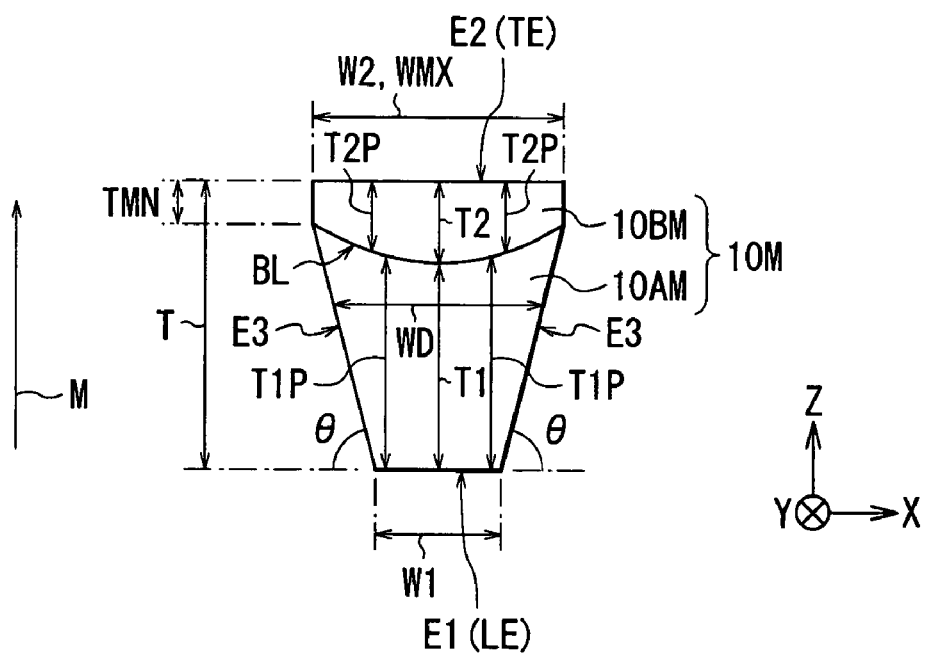
FIG. 16 is a cross section showing still another modification of the configuration of the exposed surface in the main magnetic pole layer.

Furthermore, in the embodiment, as shown in FIG. 3, the exposed surface 10M in the main magnetic pole layer 10 has a planar shape of the bilaterally-symmetrical inverted-trapezoidal shape. The invention, however, is not always limited to the case. The planar shape of the exposed surface 10M can be freely changed as long as the constructional conditions of the exposed surface 10M, that is, the conditions that the width W2 of the upper edge E2 is larger than the width W1 of the lower edge E1 and is equal to or larger than the width WD of the exposed surface 10M at an arbitrary intermediate position between the lower edge E1 and the upper edge E2 (W2>W1, W2>WD) are satisfied. For example, as shown in FIG. 16, the exposed surface 10M may be constructed so as to have bilaterally-symmetrical hexagon shape in place of the bilaterally-symmetrical inverted-trapezoidal shape, more concretely, a planar shape of a hexagon shape obtained by combining an almost quadrangle shape positioned on the trailing side and an almost inverted-trapezoidal shape positioned on the leading side. In this case, for example, the width W2 of the upper edge E2 is equal to or larger than the width WD (W2≧WD). In this case as well, effects similar to those of the foregoing embodiment can be also obtained. The other configurations of the exposed surface 10M shown in FIG. 16 are similar to those shown in FIG. 3.

Figure 17:
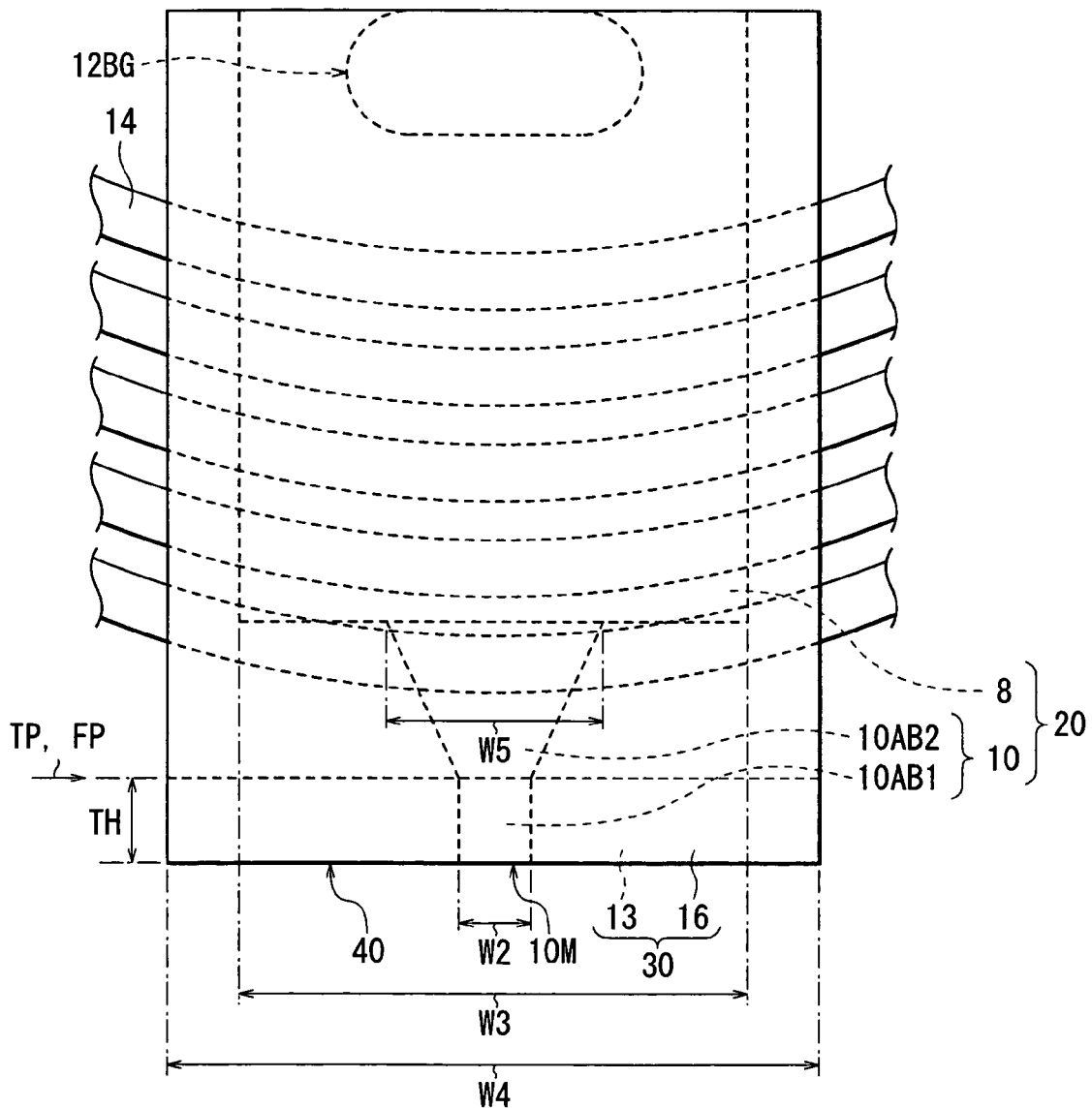
FIG. 17 is a plan view showing a modification of the configuration of the thin film magnetic head according to the embodiment of the invention.

Furthermore, in the embodiment of the invention, as shown in FIG. 2, in the planar shape of the rear end portion 10AB2 in the main magnetic pole layer 10, the width of the rear end portion 10AB2 is uniform (the width W3) in the rear portion and gradually decreases from width W3 to width W2 toward the front end portion 10AB1 in the front portion. However, the invention is not always limited to the case, but the planar shape of the rear end portion 10AB2 can be freely changed. For example, as shown in FIG. 17, a planar shape of the rear end portion 10AB2 may be employed such that the width of the rear end portion 10AB2 is uniform in the rear portion (the width W3) and gradually decreases from a width W5 (W2<W5<W3) smaller than the width W3 and larger than the width W2 to the width W2 toward the front end portion 10AB1 in the front portion. In this case as well, effects similar to those of the foregoing embodiment can be also obtained. The other configuration of the thin film magnetic head shown in FIG. 17 is similar to that shown in FIG. 2.

The thin film magnetic head according to the embodiment and the method of manufacturing the same have been described above.

Figure 18:
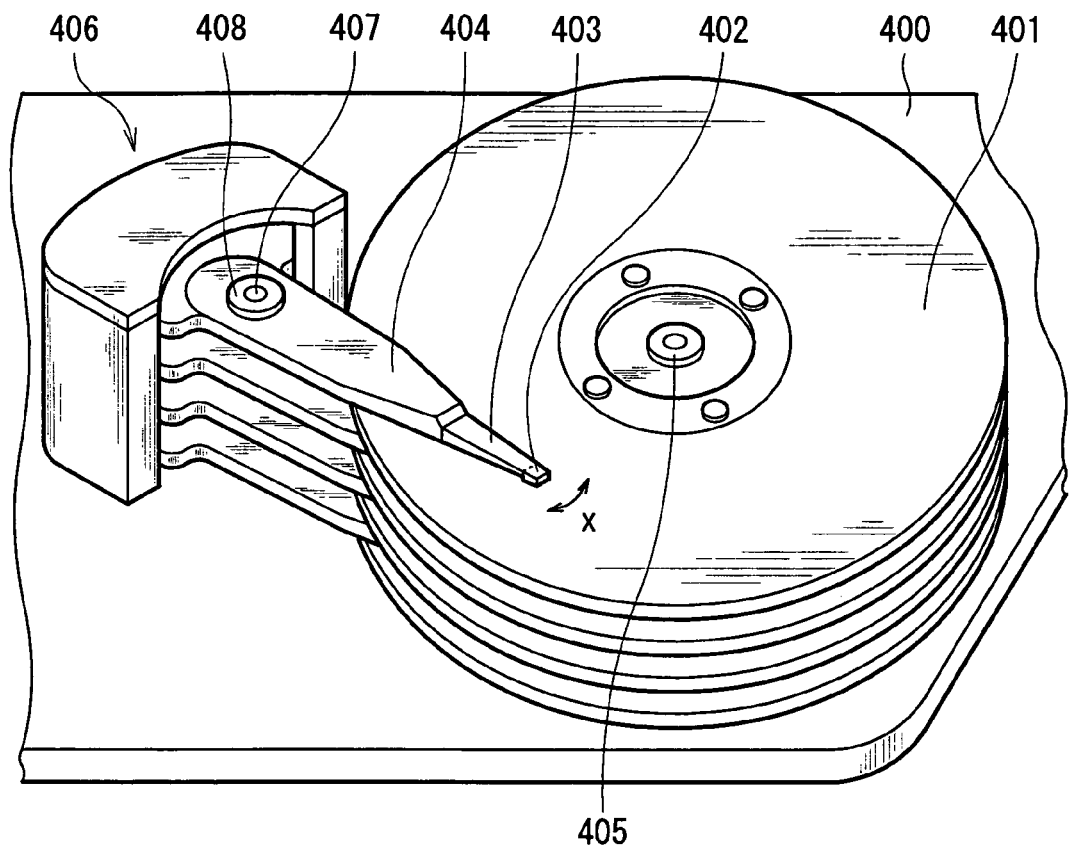
FIG. 18 is perspective view showing a perspective configuration of a magnetic recording apparatus on which the thin film magnetic head according to the embodiment of the invention is mounted.
Figure 19:
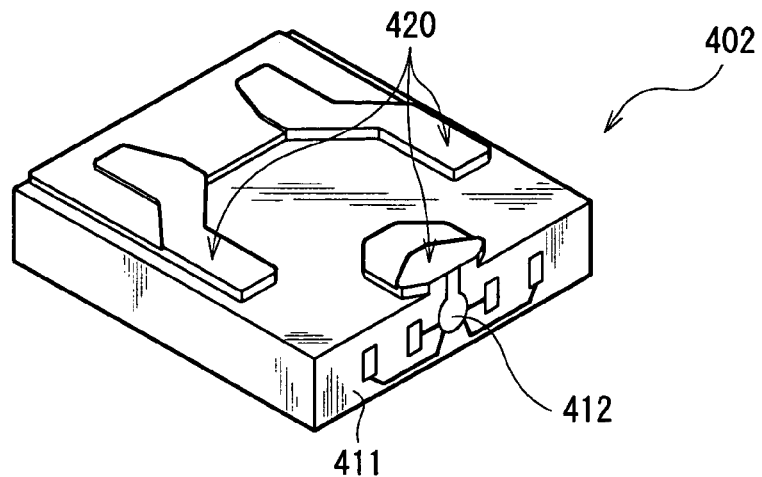
FIG. 19 is an enlarged perspective view of a main part of the magnetic recording apparatus shown in FIG. 18.

Next, with reference to FIGS. 18 and 19, the configuration of a magnetic recording apparatus on which the thin film magnetic head of the invention is mounted will be described. FIG. 18 shows a perspective view showing the configuration of the magnetic recording apparatus. FIG. 19 shows an enlarged perspective view showing the configuration of a main part in the magnetic recording apparatus. The magnetic recording apparatus is an apparatus on which the thin film magnetic head described in the foregoing embodiment is mounted and is, for example, a hard disk drive.

The magnetic recording apparatus has, as shown in FIG. 18, for example, in a casing 400, a plurality of magnetic disks (such as hard disks) 401 as recording media on which information is magnetically recorded, a plurality of suspensions 403 disposed in correspondence with the magnetic disks 401 and each supporting a magnetic head slider 402 at its one end, and a plurality of arms 404 supporting the other ends of the suspensions 403. The magnetic disk 401 is rotatable around a spindle motor 405 fixed to the casing 400 as a center. The arms 404 are connected to a driving unit 406 as a power source and are swingable via a bearing 408 around a fixed shaft 407 fixed to the casing 400 as a center. The driving unit 406 includes a driving source such as a voice coil motor. The magnetic recording apparatus is a model where, for example, a plurality of arms 404 can swing integrally around the fixed shaft 407 as a center. FIG. 18 shows the casing 400 which is partially cut away so that internal structure of the magnetic recording apparatus can be seen well.

The magnetic head slider 402 has a configuration such that, as shown in FIG. 19, a thin film magnetic head 412 capable of executing both of recording and reproducing processes as magnetic processes is attached to one of the faces of a substrate 411 having an almost rectangular parallelepiped shape and made of a nonmagnetic insulating material such as altic. The substrate 411 has, for example, one face (air bearing surface 420) including projections and depressions to decrease air resistance which occurs when the arm 404 swings. The thin film magnetic head 412 is attached to another face (the right front-side face in FIG. 19) orthogonal to the air bearing surface 420. The thin film magnetic head 412 has the configuration described in the foregoing embodiment. When the magnetic disk 401 rotates at the time of recording or reproducing information, the magnetic head slider 402 floats from the recording surface of the magnetic disk 401 by using an air current generated between the recording surface (the surface facing the magnetic head slider 402) of the magnetic disk 401 and the air bearing surface 420. FIG. 19 shows the upside down state of FIG. 18 so that the structure on the side of the air bearing surface 420 of the magnetic head slider 402 can be seen well.

In the magnetic recording apparatus, at the time of recording or reproducing information, by swing of the arm 404, the magnetic head slider 402 moves to a predetermined region (recording region) in the magnetic disk 401. When current is passed to the thin film magnetic head 412 in a state where the thin film magnetic head 412 faces the magnetic disk 401, based on the operation principle described in the foregoing embodiment, the thin film magnetic head 412 operates and performs a recording or reproducing process on the magnetic disk 401.

In the magnetic recording apparatus, the thin film magnetic head 412 of the embodiment is mounted. Consequently, as described above, recording performance can be improved by satisfying both assurance of perpendicular magnetic field strength and reduction in the record track width.

The other configuration, operation, action, effects, and modification of the thin film magnetic head 412 mounted on the magnetic recording apparatus are similar to those of the foregoing embodiment, so that their description will not be repeated.

Next, examples of the present invention will be described. The thin film magnetic head (refer to FIGS. 1A and 1B to FIG. 4; hereinbelow simply called "the thin film magnetic head of the invention") described in the foregoing embodiment was mounted on the magnetic recording apparatus (refer to FIGS. 18 and 19). The recording performances of the thin film magnetic head were examined while executing the recording process by using the magnetic recording apparatus, and results shown Table 1 were obtained.

Table 1 shows position dependence of the perpendicular magnetic field strength. Table 1 shows, when the front end width (the optical track width) of the main magnetic pole layer is used as a reference, a normalized perpendicular magnetic field strength HS (−) at "a center position (a center position in the trailing edge)" and that at "both end positions (both end positions in the trailing edge)" of an optical track width. In particular, when position dependence of the perpendicular magnetic field strength is examined as the recording performance of the thin film magnetic head of "the present invention" (refer to FIG. 10), to evaluate the recording performance by comparison, position dependence of the perpendicular magnetic field strength of the thin film magnetic head of "the first comparative example" (refer to FIG. 11) and that of the thin film magnetic head of "the second comparative example" (refer to FIG. 12) were also examined similarly, and the results are also shown in Table 1. "The normalized perpendicular magnetic field strength HS" denotes values obtained by conversion using, as 1.000, each of the perpendicular magnetic field strength at "the center position" and the perpendicular magnetic field strength at "the both end positions" obtained with respect to the thin film magnetic head of "the first comparative example" in order to compare the perpendicular magnetic field strengths among "the first comparative example", "the second comparative example", and "the present invention". At the time of examining the position dependence of the perpendicular magnetic field strength of the thin film magnetic head of "the present invention", as setting dimensions (refer to FIG. 3) of the exposed surface in the main magnetic pole layer, the height T of the exposed surface was set to 0.25 μm, the height T1 at the center position in the exposed surface area in the lower magnetic pole layer was set to 0.17 μm, the height T2 at the center position in the exposed surface area in the upper main magnetic pole layer was set to 0.08 μm, and minimum height TMN in the exposed surface area in the upper main magnetic pole layer was set to 0.015 μm. Obviously, in "the first comparative example" and "the second comparative example" as well, the dimensions of the exposed surface in the main magnetic pole layer were set like the dimensions of "the present invention".

TABLE 1

| Main magnetic pole layer | The normalized perpendicular magnetic field strength HS (−) | |
| --- | --- | --- |
| | Center position | Both end positions |
| First comparative example | 1.000 | 1.000 |
| Second comparative example | 1.103 | 1.199 |
| Present invention | 1.054 | 1.025 |

The thin film magnetic head of the perpendicular recording method is known that, generally, the perpendicular magnetic field strength is the maximum at "the center position" and the perpendicular magnetic field strength gradually decreases with distance from "the center position" to "both end positions". Consequently, in order to improve recording performance by satisfying both assurance of the perpendicular magnetic field strength and reduction in the recording track width, it is necessary to relatively maximize the perpendicular magnetic field strength at "the center position" and relatively minimize it at "the both end positions" so that the gradient of the perpendicular magnetic field becomes sharp and the fringe phenomenon of magnetic flux is suppressed.

When Table 1 is seen in consideration of those viewpoints, as understood from the results shown in Table 1, in the case where the normalized perpendicular magnetic field strength HS of the thin film magnetic head of "the first comparative example" is 1.000 at "the center position" and is 1.000 at "the both end positions", the normalized perpendicular magnetic field strength HS of the thin film magnetic head of "the second comparative example" was 1.103 at "the center position" and was 1.199 at "the both end positions". The normalized perpendicular magnetic field strength HS of the thin film magnetic head of "the present invention" was 1.054 at "the center position" and was 1.025 at "the both end positions". That is, in the thin film magnetic head of "the present invention", as compared with the thin film magnetic heads of "the first comparative example" and "the second comparative example", the normalized perpendicular magnetic field strength HS at "the center position" was larger. In contrast to the thin film magnetic heads of "the first comparative example" and "the second comparative example", the normalized perpendicular magnetic field strength HS at "the both end positions" was smaller than the standardized perpendicular magnetic field strength HS at "the center position". The result proves the followings. The thin film magnetic head of the "present invention" has the stacking structure wherein the lower main magnetic pole layer having the relatively low saturated magnetic flux density positions on the leading side and the upper main magnetic pole layer having the relatively high saturated magnetic flux density positions on the trailing side. The exposed surface has a planar shape of the bilaterally-symmetrical inverted-trapezoidal shape. In particular, based on the structural features that the main magnetic pole layer is constructed so that the height at the center position in the exposed surface area in the upper main magnetic pole layer is larger than the height at an arbitrary peripheral position around the center position in the exposed surface area of the upper main magnetic pole layer. The magnetic volume of the main magnetic pole layer is controlled so that the perpendicular magnetic field strength increases at "the center position" in order to assure a perpendicular magnetic field strength and the perpendicular magnetic field strength decreases at "the both end positions" in order to suppress the fringe phenomenon of the magnetic flux. The proof confirmed that, in the thin film magnetic head of the invention, recording performance can be improved by satisfying both assurance of the perpendicular magnetic field strength and reduction in the record track width.

Although the invention has been described above by the embodiment and the examples, the invention is not limited to the foregoing embodiment and the examples but can be variously modified. Concretely, for example, in the foregoing embodiment and the examples, the case of applying the thin film magnetic head of the invention to a composite thin film magnetic head has been described, but the invention is not limited to the case. The invention can be also applied to, for example, a thin film magnetic head dedicated to recording having an inductive magnetic transducer for writing and a thin film magnetic head having an inductive magnetic transducer for recording and reproducing. Obviously, the invention can be also applied to a thin film magnetic head having a structure in which a device for writing and a device for reading are stacked in the order opposite to that of the thin film magnetic head of the embodiment. In any of those cases, the same effects as those of the foregoing embodiment can be obtained.

The thin film magnetic head according to the invention and the method of manufacturing the same can be applied to, for example, a magnetic recording apparatus such as a hard disk drive for magnetically recording information onto a hard disk.

What is claimed is:

1. A thin film magnetic head comprising:
   a thin film coil for generating a magnetic flux; and
   a magnetic pole layer extending rearward from a recording-medium-facing surface which faces a recording medium traveling in a medium travel direction, generating a magnetic field for magnetizing the recording medium in a direction orthogonal to a surface of the recording medium on the basis of the magnetic flux generated by the thin film coil, and including a magnetic pole having an exposed surface which is defined by a first edge positioned on an opposite side in the medium travel direction and a second edge positioned in the medium travel direction and which is exposed on the recording-medium-facing surface,
   wherein the magnetic pole in the magnetic pole layer has a stacking structure in which first and second magnetic pole portions are stacked and adjacent to each other,
   the first magnetic pole portion is positioned on the opposite side in the medium travel direction, having a relatively low first saturated magnetic flux density, and having a first exposed surface area constructing a part of the exposed surface,
   the second magnetic pole portion is positioned in the medium travel direction, having a relatively high second saturated magnetic flux density, and having a second exposed surface area constructing another part of the exposed surface,
   a width of the second edge in the exposed surface is larger than a width of the first edge in the exposed surface, and is equal to or larger than a width of the exposed surface at an arbitrary intermediate position between the first and the second edges, and
   a height at a center position in the second exposed surface area is larger than a height of the second exposed surface area at an arbitrary peripheral position around the center position.

2. The thin film magnetic head according to the claim 1, wherein the height at the center position in the second exposed surface area is smaller than the height at the center position in the first exposed surface area.

3. The thin film magnetic head according to the claim 1, wherein the height at the center position in the second exposed surface area is a maximum at the center position, and gradually decreases with distance from the center position toward a periphery.

4. The thin film magnetic head according to the claim 3, wherein the height of the second exposed surface area changes so that a boundary line provided in a position where the first and second exposed surface areas are adjacent to each other bulges toward the opposite side in the medium travel direction.

5. The thin film magnetic head according to the claim 4, wherein the boundary line is not in contact with the second edge, and a minimum height of the second exposed surface area is larger than zero.

6. The thin film magnetic head according to the claim 4, wherein the boundary line is in contact with the second edge, and a minimum height of the second exposed surface area is zero.

7. The thin film magnetic head according to claim 1, wherein a maximum width of the second exposed surface area is equal to the width of the second edge.

8. The thin film magnetic head according to claim 1, wherein a maximum width of the second exposed surface area is smaller than the width of the second edge.

9. The thin film magnetic head according to claim 1, wherein the first saturated magnetic flux density is within a range from 1.80 T (tesla) to 2.30 T and the second saturated magnetic flux density is within a range from 2.20 T to 2.45 T.

10. A method of manufacturing a thin film magnetic head comprising a thin film coil for generating a magnetic flux, and a magnetic pole layer extending rearward from a recording-medium-facing surface which faces a recording medium traveling in a medium travel direction, generating a magnetic field for magnetizing the recording medium in a direction orthogonal to a surface of the recording medium on the basis of the magnetic flux generated by the thin film coil, and including a magnetic pole having an exposed surface which is defined by a first edge positioned on an opposite side in the medium travel direction and a second edge positioned in the medium travel direction and is exposed on the recording-medium-facing surface, wherein a step of forming the magnetic pole in the magnetic pole layer comprises:

a first step of forming a first pre-magnetic pole portion so as to have a shape corresponding to the magnetic pole by using a magnetic material having a relatively low first saturated magnetic flux density;

a second step of forming a first magnetic pole portion constructing a part of the magnetic pole by partially etching the first pre-magnetic pole portion from the medium travel direction; and a third step of forming a second magnetic pole portion constructing another part of the magnetic pole on the first magnetic pole portion by using a magnetic material having a relatively high second saturated magnetic flux density, thereby forming the magnetic pole so as to have a stacking structure in which the first magnetic pole portion positioned on the opposite side in the medium travel direction and the second magnetic pole portion positioned in the medium travel direction are stacked so as to be adjacent to each other, wherein a width of the second edge is larger than a width of the first edge, and is equal to or larger than a width of the exposed surface at an arbitrary intermediate position between the first and the second edges, the first magnetic pole portion has a first exposed surface area constructing a part of the exposed surface, the second magnetic pole portion has a second exposed surface area constructing another part of the exposed surface, and a height at a center position in the second exposed surface area is set to be larger than a height of the second exposed surface area at an arbitrary peripheral position around the center position.

11. The method of manufacturing a thin film magnetic head according to the claim 10, further comprising a fourth step of forming the exposed surface so as to include the first and second exposed surface areas by forming the recording-medium-facing surface by processing at least the magnetic pole.

12. The method of manufacturing a thin film magnetic head according to the claim 10, wherein the first step comprises the steps of:

forming a photoresist pattern so as to have an opening corresponding to the shape of the magnetic pole;

forming the first pre-magnetic pole portion in the opening provided in the photoresist pattern; and removing the photoresist pattern so as to leave the first pre-magnetic pole portion, the method further comprises, between the first and second steps, a fifth step of forming an insulating layer so as to bury a periphery of the first pre-magnetic pole portion by forming a pre-insulating layer so as to cover the first pre-magnetic pole portion and its peripheral area and polishing and planarizing at least the pre-insulating layer until the first pre-magnetic pole portion is exposed, in the second step, a magnetic pole formation area for forming the second magnetic pole portion is defined so as to be surrounded by the first magnetic pole portion and the insulating layer, and the third step includes the steps of:

forming a second pre-magnetic pole portion so as to bury at least the magnetic pole formation area; and forming the second magnetic pole portion in the magnetic pole formation area by polishing and planarizing at least the second pre-magnetic pole portion until the insulating layer is exposed.

13. A magnetic recording apparatus on which a recording medium and a thin film magnetic head for performing a magnetic process on the recording medium are mounted, wherein the thin film magnetic head comprises:

a thin film coil for generating a magnetic flux; and a magnetic pole layer extending rearward from a recording-medium-facing surface which faces a recording medium traveling in a medium travel direction, generating a magnetic field for magnetizing the recording medium in a direction orthogonal to a surface of the recording medium on the basis of the magnetic flux generated by the thin film coil, and including a magnetic pole having an exposed surface which is defined by a first edge positioned on an opposite side in the medium travel direction and a second edge positioned in the medium travel direction and is exposed on the recording-medium-facing surface, the magnetic pole in the magnetic pole layer has a stacking structure in which first and second magnetic pole portions are stacked and adjacent to each other, the first magnetic pole portion positioned on the opposite side in the medium travel direction, having a relatively low first saturated magnetic flux density, and having a first exposed surface area constructing a part of the exposed surface, the second magnetic pole portion positioned in the medium travel direction, having a relatively high second saturated magnetic flux density, and having a second exposed surface area constructing another part of the exposed surface, a width of the second edge in the exposed surface is larger than a width of the first edge, and is equal to or larger than a width of the exposed surface at an arbitrary intermediate position between the first and the second edges, and a height at a center position in the second exposed surface area is larger than a height of the second exposed surface area at an arbitrary peripheral position around the center position.

14. A thin film magnetic head comprising:

a magnetic pole obtained by stacking a first magnetic pole portion positioned on the opposite side in a recording medium travel direction and having a relatively low first saturated magnetic flux density and a second magnetic pole portion positioned in the recording medium travel direction and having a relatively high second saturated magnetic flux density and constructed so as to have an exposed surface exposed on a recording-medium-facing surface, and generating a recording magnetic field for magnetizing a recording medium in a perpendicular direction, wherein a height at a center position in the width direction of the second magnetic pole portion is a maximum in the width direction in the exposed surface.

15. The thin film magnetic head according to claim 14, wherein an edge in the recording medium travel direction in the second magnetic pole portion has a maximum width of the magnetic pole in the exposed surface.

* * * * *